US012469512B2

(12) United States Patent
Satomi

(10) Patent No.: US 12,469,512 B2
(45) Date of Patent: Nov. 11, 2025

(54) ECHO SUPPRESSION DEVICE, ECHO SUPPRESSION METHOD, AND ECHO SUPPRESSION PROGRAM

(71) Applicant: TRANSTRON INC., Yokohama (JP)

(72) Inventor: Yuki Satomi, Yokohama (JP)

(73) Assignee: TRANSTRON INC., Yokohama (JP)

( * ) Notice: Subject to any disclaimer, the term of this patent is extended or adjusted under 35 U.S.C. 154(b) by 250 days.

(21) Appl. No.: 17/801,955

(22) PCT Filed: Apr. 7, 2021

(86) PCT No.: PCT/JP2021/014808
§ 371 (c)(1),
(2) Date: Aug. 24, 2022

(87) PCT Pub. No.: WO2021/210473
PCT Pub. Date: Oct. 21, 2021

(65) Prior Publication Data
US 2023/0079749 A1    Mar. 16, 2023

(30) Foreign Application Priority Data

Apr. 13, 2020    (JP) ................................. 2020-071463

(51) Int. Cl.
*G10L 21/0232*    (2013.01)
*G10L 21/0208*    (2013.01)
(Continued)

(52) U.S. Cl.
CPC .......... *G10L 21/0232* (2013.01); *G10L 25/18* (2013.01); *G10L 25/21* (2013.01); *G10L 2021/02082* (2013.01)

(58) Field of Classification Search
CPC ..... G10L 21/0232; G10L 25/18; G10L 25/21; G10L 2021/02082; H04M 1/6008; H04M 9/082; H04B 3/20
See application file for complete search history.

(56) References Cited

U.S. PATENT DOCUMENTS 6,192,126 B1 *    2/2001    Koski ................... H04M 9/082
                                                379/406.14
6,434,110 B1 *    8/2002    Hemkumar ........... H04M 9/082
                                                370/290
(Continued)

FOREIGN PATENT DOCUMENTS

CA         3035020 C *  3/2023  ........... H04L 1/0026
JP    2006033789 A *  2/2006
(Continued)

OTHER PUBLICATIONS

PCT/ISA/210, "International Search Report for PCT International Application No. PCT/JP2021/014808," Jul. 6, 2021.
(Continued)

*Primary Examiner* — Douglas Godbold
*Assistant Examiner* — Cameron Kenneth Young
(74) *Attorney, Agent, or Firm* — HAUPTMAN HAM, LLP

(57) ABSTRACT

Even when a speech is small, the speech is allowed to be detected and an echo is allowed to be appropriately suppressed. Whenever a sample point of a reception signal transmitted through a receiving signal path that transmits a signal to a speaker is acquired, an optimal mask is sequentially generated or selected from base masks as one or a plurality of masks generated based on a learning signal based on a reception signal acquired within a predetermined period before a time point at which the sample point was acquired. Whenever the optimal mask is selected, whether a double-talk state is present is sequentially detected based on a result of comparing an input signal with the optimal mask. When detecting that a speech is not input to a microphone and the reception signal includes a speech, a process of suppressing an echo is sequentially performed on the input signal.

11 Claims, 16 Drawing Sheets

(51) Int. Cl.
*G10L 25/18* (2013.01)
*G10L 25/21* (2013.01)

(56) References Cited

U.S. PATENT DOCUMENTS

| | | | | |
|---|---|---|---|---|
| 7,212,628 | B2* | 5/2007 | Popovic | H04B 3/234 |
| | | | | 379/406.01 |
| 8,472,616 | B1* | 6/2013 | Jiang | H04M 9/082 |
| | | | | 379/406.01 |
| 8,744,844 | B2* | 6/2014 | Klein | G10L 21/0208 |
| | | | | 704/226 |
| 11,189,297 | B1* | 11/2021 | Nakagawa | H04R 3/02 |
| 11,380,312 | B1* | 7/2022 | Mansour | G10L 15/08 |
| 2003/0099208 | A1* | 5/2003 | Graziano | H04L 1/0001 |
| | | | | 379/406.01 |
| 2003/0108035 | A1* | 6/2003 | Langberg | H04L 47/10 |
| | | | | 370/352 |
| 2004/0247111 | A1* | 12/2004 | Popovic | H04M 9/082 |
| | | | | 379/406.01 |
| 2007/0154031 | A1* | 7/2007 | Avendano | H04R 3/005 |
| | | | | 381/91 |
| 2019/0130929 | A1* | 5/2019 | Raghunandan | H04R 29/001 |
| 2019/0222691 | A1* | 7/2019 | Shah | G10L 21/0208 |
| 2021/0051404 | A1* | 2/2021 | Li | G10L 21/0208 |

FOREIGN PATENT DOCUMENTS

| | | | |
|---|---|---|---|
| JP | 2009021741 | A * | 1/2009 |
| JP | 2018110301 | A * | 7/2018 |
| JP | 2018-201147 | A | 12/2018 |

OTHER PUBLICATIONS

Chinese First Office Action for Chinese Application No. 202180013053.5 issued on Sep. 29, 2024; 9 pp.

* cited by examiner

ECHO SUPPRESSION DEVICE, ECHO SUPPRESSION METHOD, AND ECHO SUPPRESSION PROGRAM

RELATED APPLICATIONS

The present application is National Phase of International Application No. PCT/JP2021/014808 filed Apr. 7, 2021, and claims priority from Japanese Application No. 2020-071463, filed Apr. 13, 2020, the disclosure of which is hereby incorporated by reference herein in its entirety.

TECHNICAL FIELD

The present invention relates to an echo suppression device, an echo suppression method, and an echo suppression program.

BACKGROUND ART

Patent Document 1 discloses an echo suppression device that compares a value of a mask based on a power spectrum for a learning signal transmitted through a receiving signal path with a value of a power spectrum for an input signal input from a microphone for each frequency band and detects whether a double-talk state is present. In a case of detecting that no signal is being transmitted through a transmitting signal path and that a signal is being transmitted through the receiving signal path, the echo suppression device performs a process of suppressing an echo in an input signal using an echo suppressor.

CITATION LIST

Patent Literature

Patent Document 1: JP 2018-201147 A

SUMMARY OF INVENTION

Technical Problem

However, a speech signal processing device described in Patent Document 1 generates the mask assuming a case of the large signal in the receiving signal path. Accordingly, when a speech of a user (near-end speaker) on the microphone side is small and a reception signal transmitted through the receiving signal path is large, the echo suppressor strongly acts on the input signal transmitted through the receiving signal path, possibly causing the voice of the near-end speaker to disappear.

In light of the foregoing, an object of the present invention is to provide an echo suppression device, an echo suppression method, and an echo suppression program that allow detecting a speech even in a case of the small speech and appropriately suppressing an echo.

Solution to Problem

In order to solve the problem described above, an echo suppression device according to the present invention is, for example, an echo suppression device provided in a transmitting signal path that transmits an input signal input from a microphone in a near-end terminal, including a speaker and the microphone. The echo suppression device includes a mask storage unit, a mask selection unit, a double-talk detection unit, and an echo suppressor. The mask storage unit stores a base mask as one or a plurality of masks generated based on a learning signal transmitted through the transmitting signal path when a speech is not input to the microphone and a sound is output from the speaker. The mask selection unit sequentially generates or selects an optimal mask according to a magnitude of a reception signal from the base mask based on the reception signal acquired within a predetermined period before a time point at which a sample point was acquired whenever the sample point of the reception signal transmitted through a receiving signal path that transmits a signal to the speaker is acquired. The double-talk detection unit sequentially detects whether a double-talk state is present based on a result of comparing the input signal with the optimal mask whenever the optimal mask is generated or selected. The echo suppressor sequentially performs a process of suppressing an echo on the input signal when the double-talk detection unit detects that a speech is not input to the microphone and the reception signal includes a speech.

According to the echo suppression device according to the present invention, whenever the sample point of the reception signal transmitted through the receiving signal path that transmits the signal to the speaker is acquired, the optimal mask is sequentially generated or selected from the base mask as one or the plurality of masks generated based on the learning signal, based on the reception signal acquired within the predetermined period before the time point at which the sample point was acquired. Whenever the optimal mask is selected, whether the double-talk state is present is sequentially detected based on the result of comparing the input signal with the optimal mask. When detecting that the speech is not input to the microphone and the reception signal includes the speech, the process of suppressing an echo is sequentially performed on the input signal. In this way, a magnitude of the mask is changed according to the magnitude of the reception signal, and thus the speech can be detected even when the speech is small, and the echo can be appropriately suppressed.

A mask generation unit that changes a magnitude of the learning signal to generate a plurality of masks is provided. The mask storage unit stores the plurality of masks generated by the mask generation unit as the base masks. The mask selection unit selects the optimal mask among the base masks based on a magnitude of the input signal. Thus, frequency characteristics of a residual echo can be accurately stored for each reception level, and the magnitude of the mask can be changed according to the magnitude of the reception signal. In addition, a stable call can be ensured without frequently changing an effect of the echo suppressor.

A mask generation unit that generates one mask based on the learning signal is provided. The mask storage unit stores the one mask generated by the mask generation unit as the base mask. The mask selection unit multiplies the base mask by a coefficient based on a magnitude of the input signal to generate the optimal mask. Thus, the frequency characteristics of the residual echo can be accurately stored for each reception level, and the magnitude of the mask can be changed according to the magnitude of the reception signal. Also, it is not necessary to store the plurality of base masks and a memory used can be reduced.

A signal measurement unit that measures a first time is provided. The first time is a time during which a signal is not transmitted through the transmitting signal path when a state transitions from a state in which a speech is not input to the microphone and a sound is output from the speaker to a state in which a speech is not input to the microphone and a sound is not output from the speaker. The mask selection unit sequentially generates or selects the optimal mask with the first time as the predetermined period. This allows determining the predetermined period according to a length of the echo generated by the reception signal.

A first power spectrum calculation unit that calculates an input signal power spectrum and a learning power spectrum is provided. The input signal power spectrum is a power spectrum for the input signal. The learning power spectrum is a power spectrum for the learning signal. The mask is a maximum value of the learning power spectrum for each frequency band acquired during a constant interval. The optimal mask has a value for each frequency band. The double-talk detection unit detects whether the double-talk state is present based on a result of comparing a value of the input signal power spectrum with a value of the optimal mask for each frequency band. This allows the double-talk state to be accurately detected.

A second power spectrum calculation unit that calculates a reception signal power spectrum as a power spectrum for the reception signal is provided. The mask selection unit compares a maximum value of the reception signal power spectrum with the optimal mask for each frequency band and generates or selects the optimal mask. This allows the optimal mask to be appropriately generated or selected considering frequency characteristics of the reception signal.

The double-talk detection unit compares the input signal power spectrum with the optimal mask for each frequency band. When a number of frequency bands where the input signal power spectrum is larger than the optimal mask is smaller than a first threshold or an integrated value of regions where the input signal power spectrum is larger than the optimal mask is smaller than a second threshold, the double-talk detection unit detects that a speech is not input to the microphone. Thus, a near-end speech can be accurately detected.

In order to solve the problem described above, an echo suppression method according to the present invention is, for example, an echo suppression method including: generating and storing a base mask as one or a plurality of masks based on a learning signal transmitted through a transmitting signal path that transmits a signal input from a microphone when a speech is not input to the microphone of a near-end terminal and a sound is output from a speaker of the near-end terminal; sequentially generating or selecting an optimal mask as a mask having a magnitude according to a magnitude of an input signal input from the microphone based on a reception signal acquired within a predetermined period before a time point at which a sample point was acquired whenever the sample point of the reception signal transmitted through a receiving signal path that transmits a signal to the speaker is acquired and the base mask; sequentially detecting whether a double-talk state is present based on a result of comparing the input signal with the optimal mask when the optimal mask is selected; and performing echo suppression processing that suppresses an echo on the input signal when detecting that a speech is not input to the microphone and the reception signal includes a speech.

In order to solve the problem described above, an echo suppression program according to the present invention is, for example, an echo suppression program provided in a transmitting signal path that transmits a signal input from a microphone in a near-end terminal including a speaker and the microphone. The echo suppression program causes a computer to function as: a mask storage unit that stores a base mask as one or a plurality of masks generated based on a learning signal transmitted through the transmitting signal path when a speech is not input to the microphone and a sound is output from the speaker; a mask selection unit that sequentially generates or selects an optimal mask according to a magnitude of a reception signal from the base masks based on the reception signal acquired within a predetermined period before a time point at which a sample point was acquired whenever the sample point of the reception signal transmitted through a receiving signal path that transmits a signal to the speaker is acquired; a double-talk detection unit that sequentially detects whether a double-talk state is present based on a result of comparing an input signal input from the microphone with the optimal mask whenever the optimal mask is generated or selected; and an echo suppressor that sequentially performs a process of suppressing an echo on the input signal when the double-talk detection unit detects that a speech is not input to the microphone and the reception signal includes a speech.

Advantageous Effects of Invention

According to the present invention, even when a speech is small, the speech can be detected and an echo can be appropriately suppressed.

BRIEF DESCRIPTION OF DRAWINGS

FIGS. 7(A) and 7(B) are diagrams illustrating a relationship between a reception signal and an input signal when a near-end speech is absent, wherein FIG. 7(A) illustrates the reception signal, and FIG. 7(B) illustrates the input signal.

FIGS. 8(A) and 8(B) are diagrams illustrating a relationship between a reception signal and an input signal when a near-end speech is absent, wherein FIG. 8(A) illustrates the reception signal, and FIG. 8(B) illustrates the input signal.

DESCRIPTION OF EMBODIMENTS

Embodiments of an echo suppression device according to the present invention will be described below in detail with reference to the drawings. An echo suppression device is a device suppressing echo generated during a telephone call in a voice communication system.

First Embodiment

Figure 1:
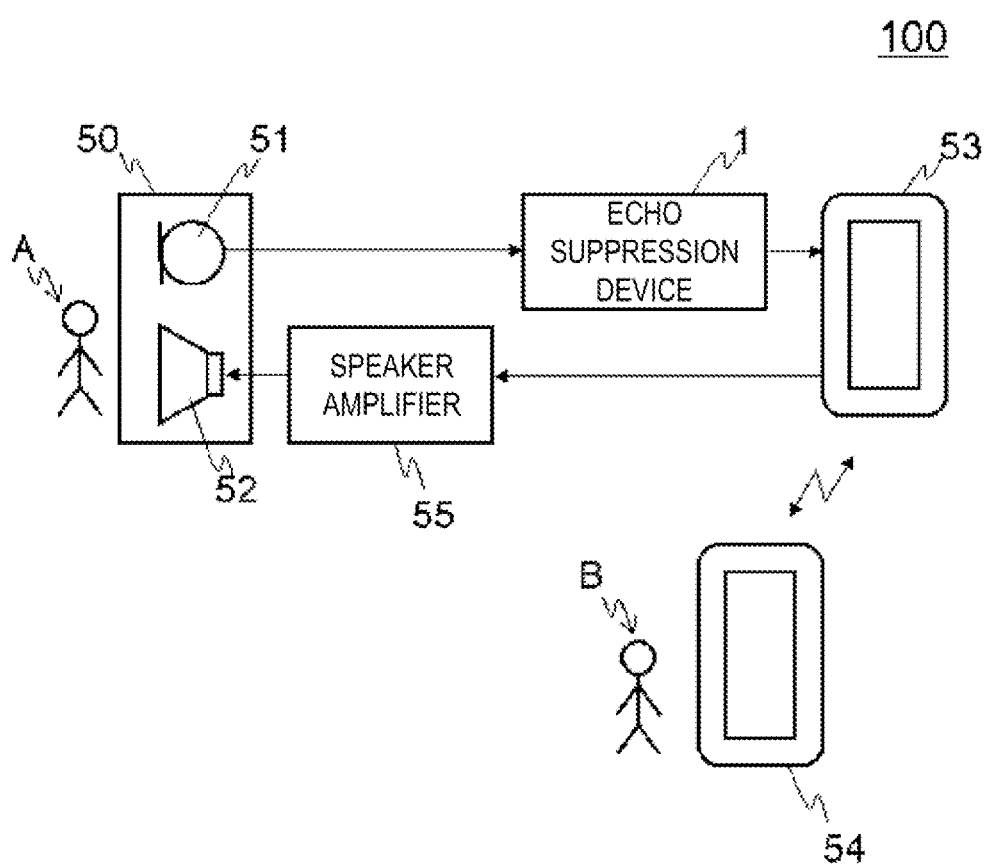
FIG. 1 is a diagram schematically illustrating a voice communication system 100 provided with an echo suppression device 1 according to a first embodiment.

FIG. 1 is a diagram schematically illustrating a voice communication system 100 provided with an echo suppression device 1 according to the first embodiment. The voice communication system 100 mainly includes a terminal 50 including a microphone 51 and a speaker 52, two cell phones 53 and 54, a speaker amplifier 55, and the echo suppression device 1.

The voice communication system 100 is a system in which a near-end speaker (user A on a near-end side) utilizing the terminal 50 (near-end terminal) is in voice communication with a far-end speaker (user B on a far-end side) utilizing the cell phone 54 (far-end terminal). A voice signal input via the cell phone 54 is amplified and output by the speaker 52, and a voice emitted by the user on the near-end side is collected by the microphone 51 and transmitted to the cell phone 54. Thus, the user A can make an amplified voice call (hands-free call) without holding the cell phone 53. The cell phone 53 and the cell phone 54 are connected together by a common telephone line.

The echo suppression device 1 is provided on a transmitting signal path through which signals input via the microphone 51 are transmitted from the terminal 50 to the cell phone 53.

The echo suppression device 1 may be configured as a dedicated board mounted on a speech terminal or the like (for example, an on-board device, a conference system, or a mobile terminal) in the voice communication system 100. Additionally, the echo suppression device 1 may include, for example, mainly a computer system including an arithmetic device, such as a Central Processing Unit (CPU), for performing information processing, and a storage device, such as a Read Only Memory (RAM) and a Read Only Memory (ROM), and software (echo suppression program). The echo suppression program may be stored in advance in, for example, a HDD as a storage medium built into a device, such as a computer, and a ROM in a microcomputer including a CPU, and may be installed from it into a computer. Additionally, the echo suppression program may be temporarily or permanently stored (memorized) in a removable storage medium such as a semiconductor memory, a memory card, an optical disc, a magneto-optical disk, a magnetic disk, or the like.

Figure 2:
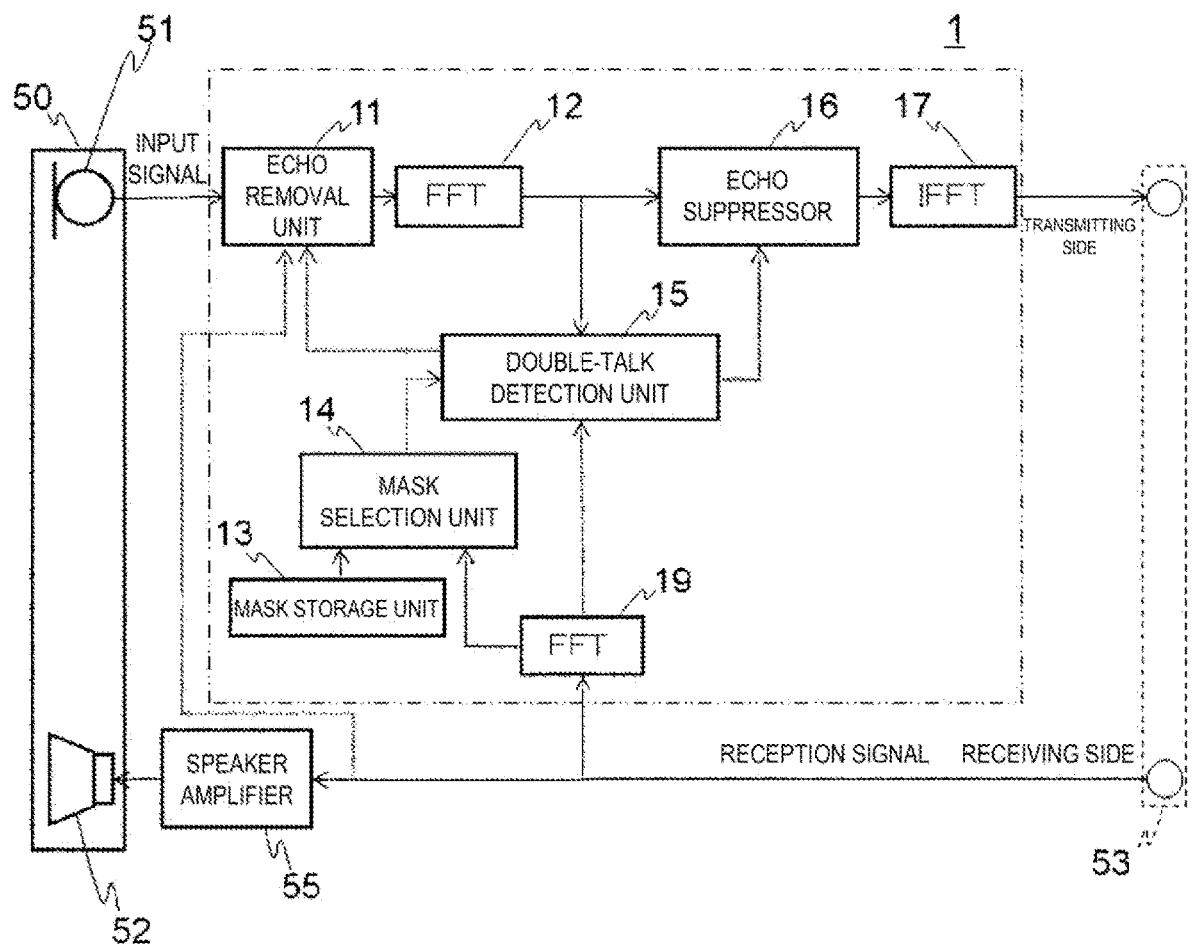
FIG. 2 is a diagram illustrating an overview of a function block of the echo suppression device 1.

FIG. 2 is a diagram illustrating an overview of a function block of the echo suppression device 1. The echo suppression device 1 functionally mainly includes an echo removal unit 11, frequency analyzers (FFT units) 12 and 19, a mask storage unit 13, a mask selection unit 14, a double-talk detection unit 15, an echo suppressor 16, and a restoration unit (IFFT unit) 17. In FIG. 2, an upper signal path is a transmitting signal path through which input signals input from the microphone 51 are transmitted, and a lower signal path is a receiving signal path through which signals are transmitted to the speaker 52. Note that the functional components of the echo suppression device 1 may be classified into more components according to the processing content, or one component may perform processing of a plurality of components.

The echo removal unit 11, for example, uses an adaptive filter to remove an echo. The echo removal unit 11 updates a filter coefficient according to a given procedure to generate a pseudo echo signal from a signal transmitted through the receiving signal path, and subtracts the pseudo echo signal from a signal transmitted through the transmitting signal path to remove the echo. Note that adaptive filters are well known, and thus description of the adaptive filter is omitted. Note that in the present embodiment, an adaptive filter is applied to the echo removal unit 11 but any other known echo removal technique can be applied to the echo removal unit 11. Additionally, although the echo removal unit 11 is not essential, by generating the mask using a learning signal in which a part of the echo has been removed, as described in detail later, even when the value of the mask decreases and the input signal is small, it can be further accurately detected that a value of power spectrum (hereinafter referred to as an input signal power spectrum) for the input signal is likely to exceed the value of the mask and the near-end speech (speech by the user A (see FIG. 1)) is present. Therefore, providing the echo removal unit 11 is desirable.

The frequency analyzers (FFT units) 12 and 19 perform a Fast Fourier Transform (FFT) on the signal. The FFT unit 12 performs the fast Fourier transform on the signal transmitted through the transmitting signal path, here, the signal that has passed through the echo removal unit 11, and the FFT unit 19 performs the fast Fourier transform on the reception signal transmitted through the receiving signal path. The FFT units 12 and 19 obtain a result of transforming a function of time into a function of frequency as X [i] for each frequency band i.

Figure 3:
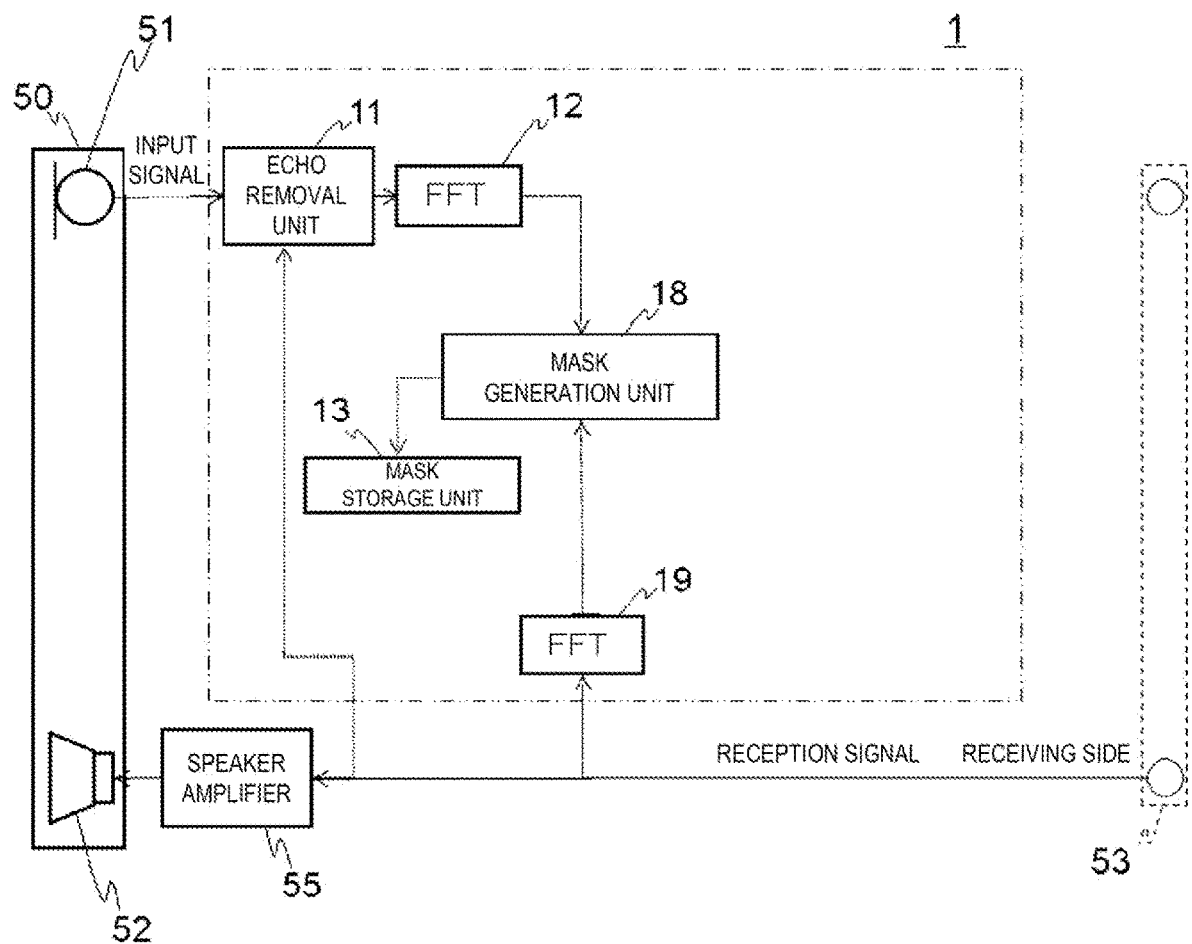
FIG. 3 is a diagram illustrating an overview of a function block in a case where a mask is generated in the echo suppression device 1.

The mask storage unit 13 stores the mask generated by a mask generation unit 18 (see FIG. 3). The generation of the mask will be described in detail below. The mask is generated in advance before the echo suppression device 1 performs the process of suppressing an echo.

FIG. 3 is a diagram illustrating an overview of the function block in a case where the mask is generated in the echo suppression device 1. The echo suppression device 1 functionally includes the mask generation unit 18. The generation process of the mask is mainly performed by the mask generation unit 18.

The generation process of the mask will be described in detail below. First, after the adaptive filter in the echo removal unit 11 finishes sufficient learning, one-sided speech (single-talk) on a far-end side in which a sound is output from the speaker 52 is repeated under a situation of absence of the near-end speech. A signal transmitted through the transmitting signal path during the single-talk is used as a learning signal. In the echo suppression device 1, the learning signal corresponds to a signal in which the echo has been removed by the echo removal unit 11.

The learning signal is input to the FFT unit 12. The FFT unit 12 performs the fast Fourier transform on the learning signal and inputs it to the mask generation unit 18. The mask generation unit 18 calculates, at each regular interval, the power spectrum for the learning signal to obtain a plurality of learning power spectrums. Here, the regular intervals are predetermined time regions arbitrarily defined and are designated as times t1, t2, t3, . . . .

Note that the power spectrum P [i] represents the power of X [i] for each frequency element i obtained by the fast Fourier transform as a function of frequency element (see Equation (1)).

Equation 1

$$P[i] = |X[i]|^2 = X[i] * X[i] \qquad (1)$$

Figure 4:
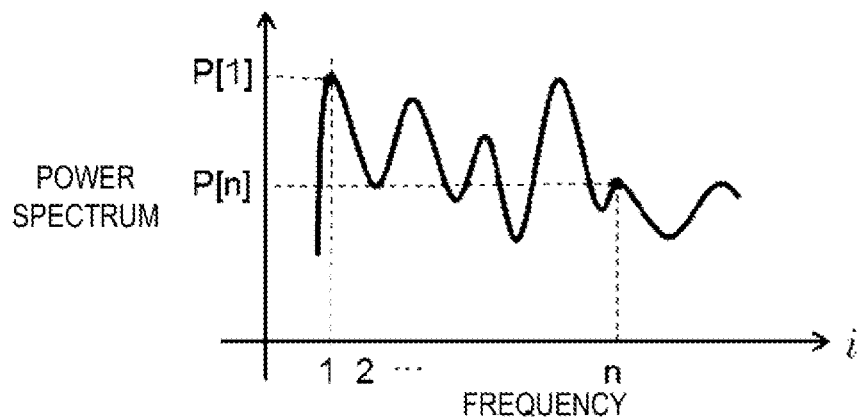
FIG. 4 is an example of a learning power spectrum at a time t1.

FIG. 4 is an example of the learning power spectrum at a time t1. Hereinafter, the power (value on the vertical axis) in the power spectrum is referred to as the value of the power spectrum. The horizontal axis of the power spectrum plots a frequency. The mask generation unit 18 stores the plurality of learning power spectrums calculated in each section.

Figure 5:
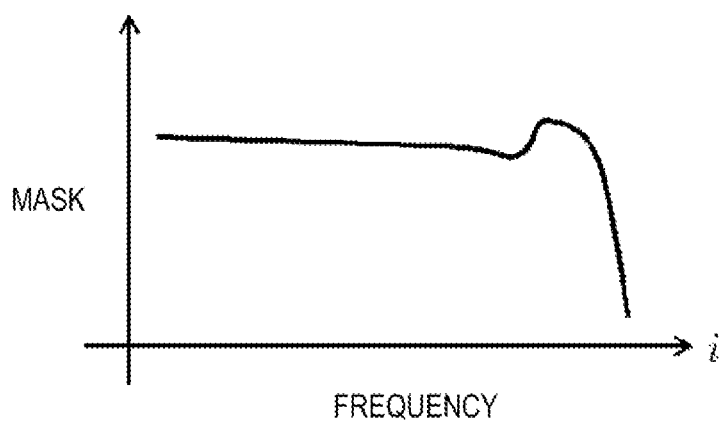
FIG. 5 is an example of a mask in a case where a plurality of learning power spectrums including the learning power spectrum illustrated in FIG. 4 is input.

The mask generation unit 18 acquires, for each frequency band, the maximum value among the values of the plurality of learning power spectrums, and uses the maximum value as the mask. FIG. 5 is an example of a mask in a case where the plurality of learning power spectrums including the learning power spectrum illustrated in FIG. 4 is input. The mask generation unit 18 outputs the generated mask to the mask storage unit 13, and the mask storage unit 13 stores the mask.

Figure 6:
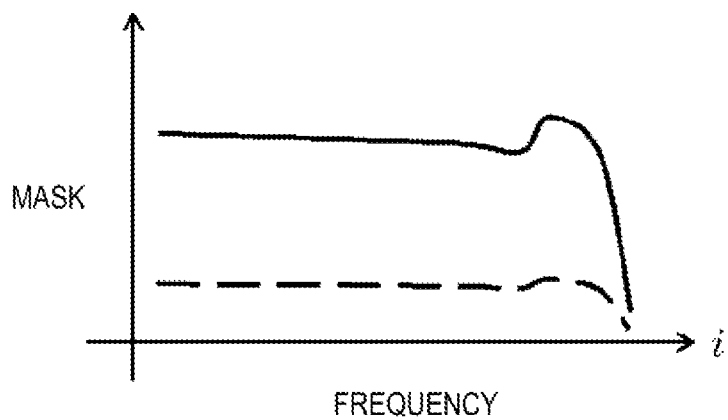
FIG. 6 is a diagram illustrating an example of two masks having different reception levels.

In the present embodiment, the mask generation unit 18 changes the magnitude (reception level) of the learning signal to generate a plurality of masks. FIG. 6 is a diagram illustrating an example of two masks having different reception levels. The solid line in FIG. 6 is a mask when the reception level is large, that is, when the echo possibly largely returns, and the dashed line in FIG. 6 is a mask when the reception level is small. In this manner, the mask generation unit 18 performs a process that changes the magnitude of the learning signal and generates the mask by a plurality of times to generate a plurality of masks. Thus, the frequency characteristics of residual echo can be accurately stored for each reception level.

Note that the number of masks generated by the mask generation unit 18 and stored in the mask storage unit 13 is not limited to two, and may be three or more. Hereinafter, a plurality of masks stored in the mask storage unit 13 is referred to as base masks.

The description will now return to FIG. 2. To the mask selection unit 14, the power spectrum (hereinafter referred to as a reception signal power spectrum) for the reception signal is sequentially input from the double-talk detection unit 15. When the reception signal power spectrum is sequentially input (a sample point is acquired), the mask selection unit 14 sequentially selects the mask (hereinafter referred to as an optimal mask) according to the magnitude of the reception signal from the base masks based on the reception signal acquired within a predetermined period before a time point at which the sample point was acquired.

Here, the predetermined period before the time point at which the sample point was acquired is obtained based on the time required until the value of the input signal becomes 0 after the reception signal becomes 0 (after a sound is not output from the speaker 52). Although this predetermined period changes depending on the magnitude of the reception signal, the predetermined period is approximately from several 10 ms to several 100 ms at the shortest, and is approximately from one second to two seconds at the longest.

Figure 7A:
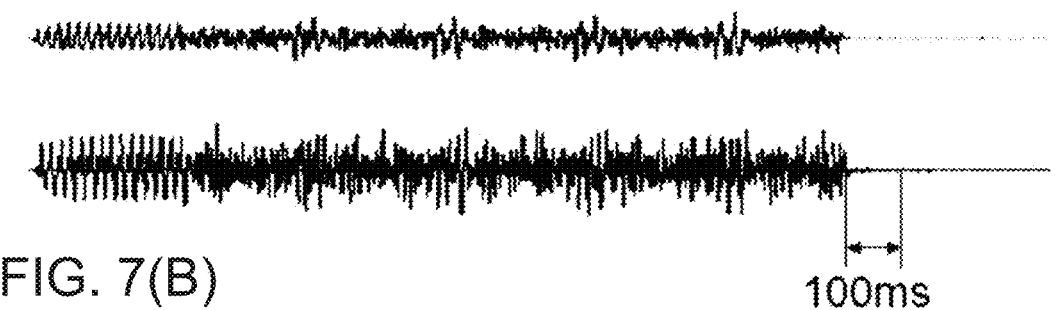
Figure 8A:
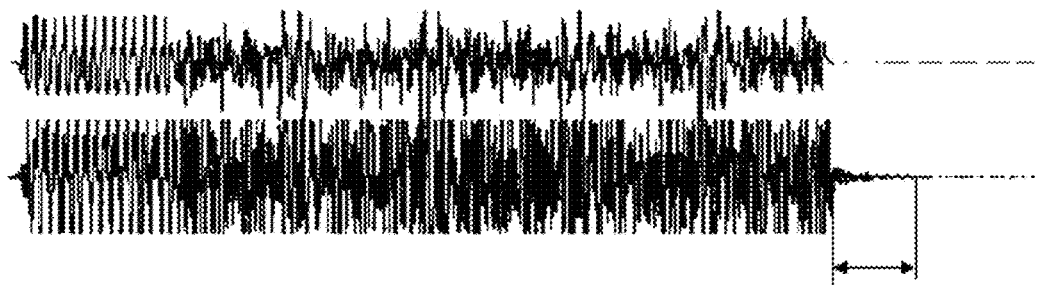

FIGS. 7(A), 7(B) and 8(A), 8(B) are diagrams illustrating a relationship between the reception signal and the input signal when the near-end speech is absent (a speech is not input to the microphone 51). FIGS. 7(A) and 8(A) indicate the reception signal, and FIGS. 7(B) and 8(B) indicate the input signal. FIGS. 7(A) and 7(B) are a case where the level of the reception signal is small, and FIGS. 8(A) and 8(B) illustrate a case where the level of the reception signal is large.

For example, a reflection of sound inside a vehicle or a vibration of the speaker 52 is output from the speaker 52 as a sound, and therefore an echo signal is present as the input signal even without the near-end speech. In the case where the level of the reception signal is small, the input signal is present approximately 100 ms even after the reception signal becomes 0, and in the case where the level of the reception signal is large, the input signal is present approximately 150 ms even after the reception signal becomes 0. Therefore, in the present embodiment, the predetermined time is set to be from approximately 100 ms to approximately 300 ms.

The mask selection unit 14 selects the optimal mask based on the maximum value of the power of the reception signal acquired within from approximately 100 ms to approximately 300 ms before the time point at which the sample point of the reception signal power spectrum was acquired.

Figure 9:
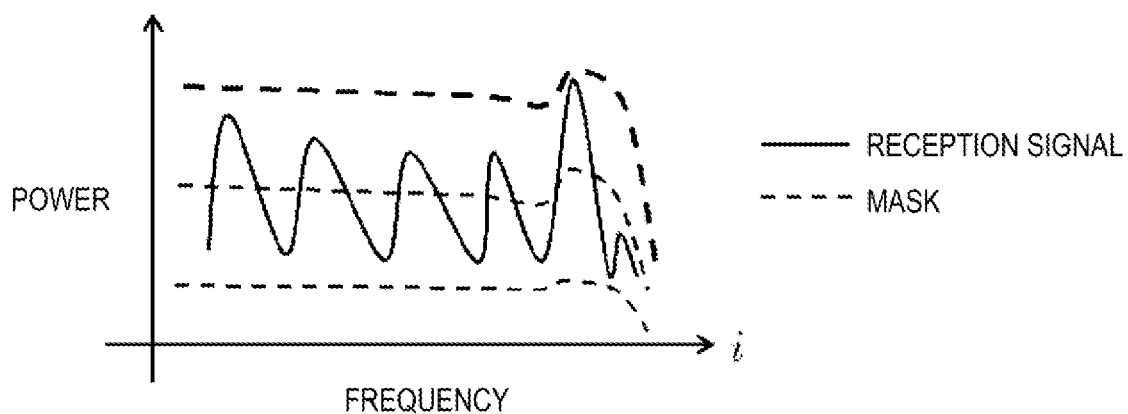
FIG. 9 is a diagram schematically illustrating a relationship between a maximum value of the reception signal acquired within a predetermined period before a time point at which a sample point was acquired for each frequency band and an optimal mask.
Figure 10:
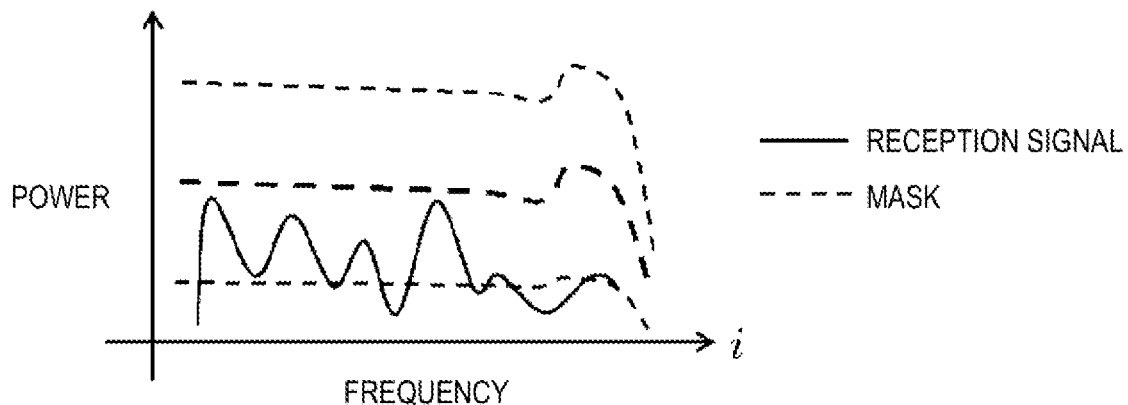
FIG. 10 is a diagram schematically illustrating a relationship between a maximum value of the reception signal acquired within a predetermined period before a time point at which a sample point was acquired for each frequency band and an optimal mask.

FIGS. 9 and 10 are diagrams schematically illustrating a relationship between a maximum value of the reception signal power spectrum acquired within a predetermined period before a time point at which a sample point was acquired for each frequency band and an optimal mask. In FIGS. 9 and 10, the solid line indicates the maximum value of the reception signal power spectrum acquired within the predetermined period and the dashed line indicates the base mask. Here, it is assumed that the three masks are stored as the base masks. The mask selection unit 14 compares the maximum value of the power of the reception signal with the base mask for each frequency band, and selects the mask closest to the reception signal as the optimal mask such that the value of the mask does not become smaller than the maximum value of the reception signal in any frequency band. In the case illustrated in FIG. 9, the mask having the largest value is selected (see the thick dotted line in FIG. 9), and in the case illustrated in FIG. 10, the mask having the intermediate value is selected (see the thick dotted line in FIG. 10). This allows the optimal mask to be selected considering frequency characteristics of the reception signal.

Note that the mask selection unit 14 may select the optimal mask based on the sum and the average value of the powers of the reception signals acquired within from approximately 100 ms to approximately 300 ms before the time point at which the sample point of the reception signal power spectrum was acquired, rather than selecting the optimal mask based on the maximum value of the power of the reception signal acquired within from approximately 100 ms to approximately 300 ms before the time point at which the sample point of the reception signal power spectrum was acquired.

Figure 11:
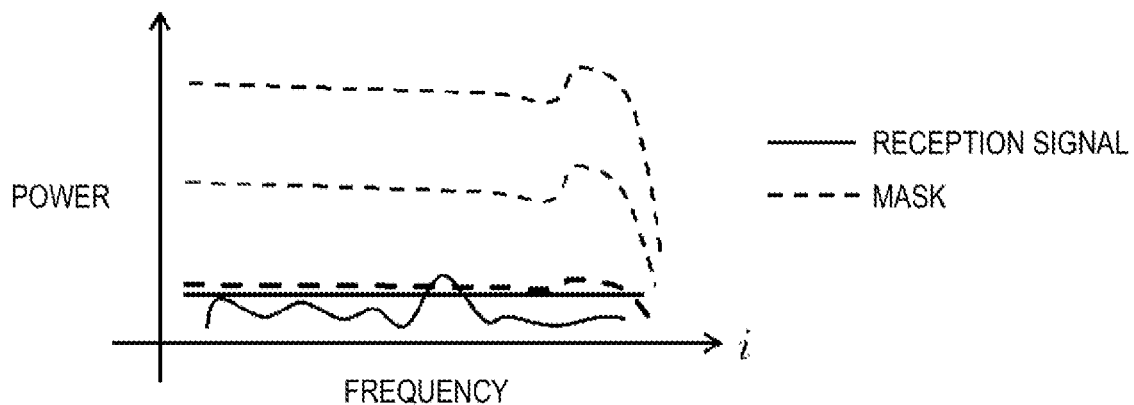
FIG. 11 is a diagram schematically illustrating an example of selecting the optimal mask based on a sum of powers of the reception signals obtained in accordance with a frequency band.

FIG. 11 is a diagram schematically illustrating an example of selecting the optimal mask based on the average value of powers of the reception signal obtained in accordance with the frequency band. In FIG. 11, the thin solid line indicates the maximum value of the power spectrum of the reception signal, the thick solid line indicates the average value found by adding the maximum values (the thin line in FIG. 9) of the power spectrum of the reception signal in accordance with the frequency band (sum) and dividing it by the frequency band. That is, the average value is synonymous with the sum. In FIG. 11, the dotted line is a mask.

The mask selection unit 14 compares the average value of the reception signal with the mask for each frequency band, and selects the mask closest to the reception signal as the optimal mask such that the mask does not become smaller than the average value of the reception signal. In FIG. 11, the mask having the smallest value is selected (see the thick dotted line in FIG. 11).

Note that in a case where the optimal mask is selected based on the sum of the powers of the reception signals obtained in accordance with the frequency band, the sum of the powers of the reception signals obtained in accordance with the frequency band is compared with the sum of the powers of the base masks, and the mask closest to the reception signal is selected as the optimal mask such that the mask does not become smaller than the sum of the powers of the reception signals. In this way, by selecting the optimal mask based on the sum or the average value of the powers of the reception signals, an influence when only the power in one frequency band stands out can be reduced.

The description will now return to FIG. 2. The double-talk detection unit 15 calculates the respective input signal power spectrum and reception signal power spectrum at every unit time based on the spectrum waveforms input from the FFT units 12 and 19. Note that a part of the FFT unit 12 and the double-talk detection unit 15 are equivalent to a first power spectrum calculation unit of the present invention, and a part of the FFT unit 19 and the double-talk detection unit 15 are equivalent to a second power spectrum calculation unit of the present invention.

Whenever the mask selection unit 14 selects the optimal mask, the double-talk detection unit 15 sequentially compares, for each frequency band, the value of the input signal power spectrum with the value of the optimal mask selected by the mask selection unit 14. Then, the double-talk detection unit 15 detects, based on the comparison results, whether a double-talk state is present. The double-talk detection unit 15 performs processing of detecting whether there is a double-talk state, at every unit time when the input signal power spectrum is calculated.

Hereinafter, a method for detecting whether there is a double-talk state, the method being performed by the double-talk detection unit 15, will be described in detail. Here, the double-talk state is a state where both of the near-end speaker (user A) and the far-end speaker (user B) are speaking.

First, the double-talk detection unit 15 compares, for each frequency band, the value of the input signal power spectrum with the value of the optimal mask, and counts the number of frequency bands in which the value of the input signal power spectrum is larger than the value of the optimal mask (hereinafter referred to as the "excess number"). The double-talk detection unit 15 determines whether the excess number is equal to or less than a threshold I (equivalent to a first threshold) prepared in advance. Note that the threshold I can be set to any value.

Figure 12:
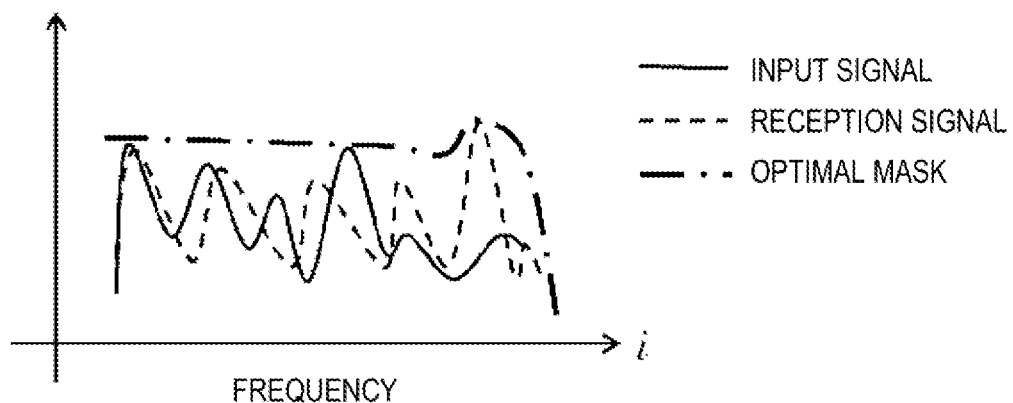
FIG. 12 is a diagram schematically illustrating a state of comparison between a value of an input signal power spectrum and a value of the mask.
Figure 13:
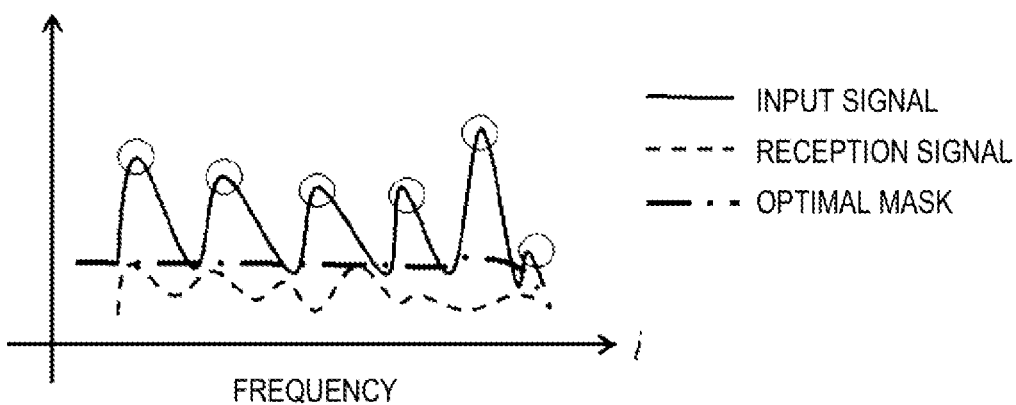
FIG. 13 is a diagram schematically illustrating a state of comparison between a value of an input signal power spectrum and a value of the mask.

Each of FIGS. 12 and 13 is a diagram schematically illustrating a state of comparison between the value of the input signal power spectrum and the value of the mask. In FIGS. 12 and 13, the solid line indicates the input signal power spectrum, the dashed line indicates the reception signal, and the dash-dotted line indicates the mask.

In the case illustrated in FIG. 12, the mask in which the reception signal acquired within the recent predetermined period is large and the value of the mask is large is selected as the optimal mask. Since the excess number is 0 and is equal to or less than the threshold I (for example, the threshold I=3), the double-talk detection unit 15 detects the absence of the near-end speech.

In the case illustrated in FIG. 13, the mask in which the reception signal acquired within the recent predetermined period is small and the value of the mask is small is selected as the optimal mask. Since the excess number (see the circles of FIG. 13) is equal to or more than the threshold I, the double-talk detection unit 15 detects the presence of the near-end speech.

Additionally, the double-talk detection unit 15 acquires the power spectrum of the reception signal transmitted from the cell phone 53 to the terminal 50, and obtains the signal level. The power spectrum of the reception signal is acquired from the receiving signal path via the FFT unit 19. The double-talk detection unit 15 compares the signal level of the reception signal with a threshold III prepared in advance. Note that the threshold III can be set to any value.

When the signal level of the reception signal is equal to or more than the threshold III prepared in advance, the double-talk detection unit 15 detects that the far-end speech (the speech by the user B (see FIG. 1)) is present and the reception signal includes the speech.

In this way, the double-talk detection unit 15 detects the presence or absence of the near-end speech and the far-end speech based on the thresholds I and III, and thus detects whether there is the double-talk state under which the near-end speech and the far-end speech are present, the single-talk of only the near-end speech, or the single-talk of only the far-end speech.

Note that the method of detecting the presence or absence of the near-end speech by the double-talk detection unit 15 is not limited to the method performed based on whether the excess number is equal to or more than the threshold I. For example, the double-talk detection unit 15 may obtain whether the sum (integrated value) of the portions where the value of the input signal power spectrum is larger than the value of the mask is equal to or less than the threshold II (equivalent to the second threshold) prepared in advance, and may detect the presence or absence of the near-end speech based on the result. Note that the threshold II can be set to any value.

Figure 14:
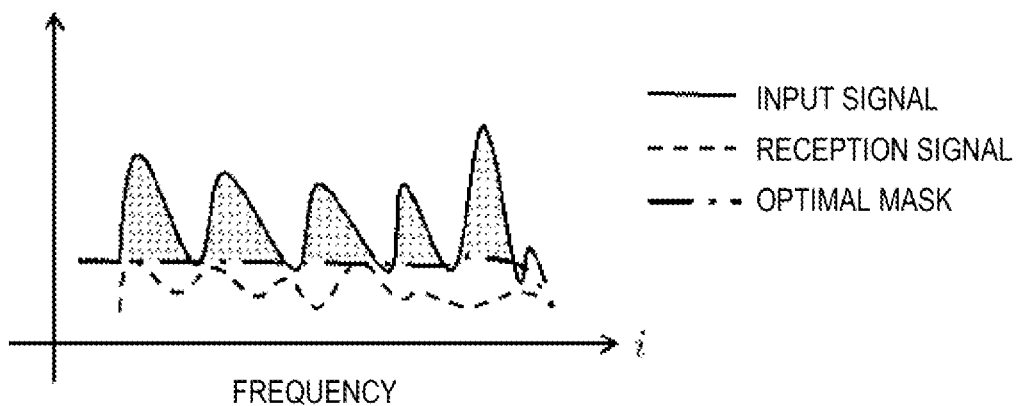
FIG. 14 is a diagram schematically illustrating a state of comparison between a value of an input signal power spectrum and a value of the mask.

FIG. 14 is a diagram schematically illustrating a state of comparison between the value of the input signal power spectrum and the value of the optimal mask. In FIG. 14, the solid line indicates the input signal power spectrum, the dashed line indicates the reception signal, and the dash-dotted line indicates the optimal mask. Further, in FIG. 14, the portion where the value of the input signal power spectrum is larger than the value of the mask is shaded with diagonal lines. The double-talk detection unit 15 obtains the area of the shaded portion. In FIG. 14, since the area of the portion where the value of the input signal power spectrum is larger than the value of the mask is equal to or more than the threshold III, the double-talk detection unit detects that the signal is transmitted (the near-end speech is present) through the transmitting signal path.

The description will now return to FIG. 2. The echo suppressor 16 performs echo suppression processing (processing of strongly suppressing an echo) on the input signal that has passed through the FFT unit 12. The echo suppressor 16 enables the echo suppression processing in a case where single-talk with only far-end speech is present, and otherwise disables the echo suppression processing. The echo suppression processing is well known, and thus, detailed description of the processing is omitted.

Note that, in the present embodiment, the echo suppressor 16 disables the echo suppression processing in the case other than the single-talk only with the far-end speech and switches ON/OFF of the echo suppression processing, but may switch the intensity of the echo suppression processing. For example, in the case of the single-talk only with the far-end speech, the echo may be strongly suppressed, and in other cases, the echo may be weakly suppressed.

The result of detection of whether there is a double-talk state is input from the double-talk detection unit 15 to the echo suppressor 16 at every unit time. Thus, the echo suppressor 16 switches between enabling and disabling the echo suppression processing at every unit time.

The IFFT unit 17 performs Inverse FFT (IFFT) on the input signal that has passed through the FFT unit 12.

Figure 15:
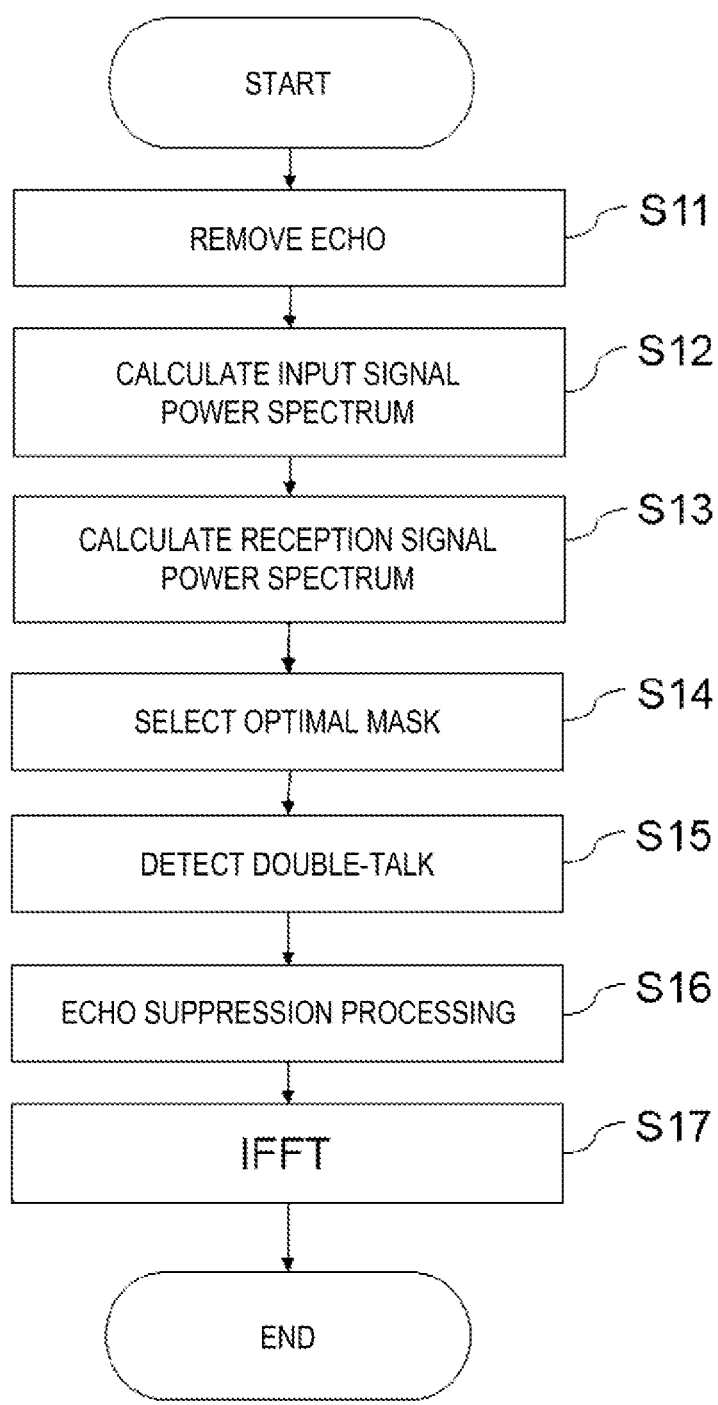
FIG. 15 is a flowchart depicting a flow of processes of sequentially reducing an echo by the echo suppression device 1.

FIG. 15 is a flowchart depicting a flow of processes of sequentially reducing the echo by the echo suppression device 1. The processing is performed continuously at every predetermined time while the reception signal and the input signal are input to the echo suppression device 1.

First, the echo removal unit 11 removes the echo from the input signal (Step S11), and the double-talk detection unit 15 calculates the power spectrum of the input signal from which the echo has been removed (Step S12). The double-talk detection unit 15 calculates the reception signal power spectrum (Step S13), and the mask selection unit 14 selects the optimal mask among the base masks based on the reception signal power spectrum (Step S14). Note that Step S11 or Step S12 and Step S13 may be performed simultaneously.

Next, the double-talk detection unit 15 detects whether there is the double-talk state based on the input signal power spectrum calculated in Step S12 and the reception signal power spectrum calculated in Step S13 (Step S15). Then, when the single-talk only with the far-end speech is present and the double-talk state is absent, the echo suppressor 16 performs the echo suppression processing on the input signal power spectrum calculated in Step S12 (Step S16). Finally, the IFFT unit 17 returns the input signal power spectrum to a time axis signal (Step S17).

According to the present embodiment, a difference in frequency characteristics between an input signal based on near-end speech and a residual echo resulting from far-end speech is focused on. The frequency characteristics of the residual echo are stored as a mask, and the frequency characteristics of the input signal are compared with the mask to accurately detect the double-talk state. When there is no double-talk state, the echo suppression processing is enabled to allow the echo to be reliably suppressed without degrading near-end voice (voice input from the microphone 51).

In addition, according to the present embodiment, since the magnitude of the mask is changed according to the magnitude of the reception signal, a speech can be detected even when the speech is small, and the echo can be appropriately suppressed.

For example, when using only a mask generated assuming the large reception signal is used, the speech by the user (near-end speaker) on the microphone side is small, and when the reception signal is large, the echo suppressor strongly acts on the input signal transmitted through the receiving signal path, and the voice of near-end the speaker possibly disappears. On the other hand, in the present embodiment, the magnitude of the learning signal is changed, a plurality of masks is generated, and the mask closest to the reception signal is selected among them as the optimal mask, that is, the double-talk state is accurately detected using the optimal mask in accordance with the magnitude of the echo that possibly occurs. Thus, the speech can be detected even when the speech is small, and strong action by the echo suppressor more than necessary can be prevented.

In addition, for example, when the far-end speaker (user B) is at a call center, the reception signal might pick up the voice of the speaker adjacent to the user B. In such a case, since the small reception signal continues, the double-talk state cannot be appropriately detected in the mask generated assuming the large reception signal. In contrast, in the present embodiment, the double-talk state is accurately detected using the optimal mask in accordance with the magnitude of the reception signal, and thus such a situation can also be handled.

In addition, according to the present embodiment, when the reception signal power spectrum is sequentially input, the mask selection unit 14 sequentially selects the optimal mask from the base masks based on the reception signal acquired within the predetermined period before the time point at which the sample point was acquired. Thus, a stable call can be ensured without frequently changing the effect of the echo suppressor.

Since the cell phone 53 and the cell phone 54 are connected by a general telephone line, depending on the communication state, loudness of the sound output from the speaker 52 (the magnitude of the reception signal) frequently changes. When the optimal mask is selected based on only the magnitude of the reception signal at the time point when the sample point was acquired, the frequent change of the reception signal frequently switches the mask. As a result, it is possibly difficult for the far-end speaker to hear the voice of the near-end speaker. In contrast, the selection of the optimal mask based on the reception signal acquired within the predetermined period before the time point at which the sample point was acquired allows preventing frequent switching of the mask and stabilizes the quality of call.

In addition, even in a case where the signal is not input from the reception side, due to, for example, a reflection of sound inside a vehicle or a vibration of the speaker 52, the sound is possibly output from the speaker 52. In such a case, when the optimal mask is selected based on only the magnitude of the reception signal at the time point at which the sample point was acquired, since the reception signal is 0, the echo suppressor 16 does not function and cannot cancel the echo. In contrast, the selection of the optimal mask based on the reception signal acquired within the predetermined period before the time point at which the sample point was acquired allows selecting the optimal mask including the previous state. Additionally, an echo output, for example, due to the reflection of sound inside a vehicle or the vibration of the speaker 52 from the speaker 52 as a sound can be canceled.

Note that in the embodiment of the present invention, for the mask selection unit 14 to select the optimal mask based on the reception signal acquired within the predetermined period before the time point at which the sample point of the reception signal was acquired, the predetermined period is determined as from approximately 100 ms to approximately 300 m in advance, but the value of the predetermined period and the way of determining the predetermined time are not limited thereto. For example, to generate the mask, the mask generation unit 18 may measure the time until the input signal reaches 0 after the reception signal becomes 0 and determine the predetermined time based on the measured time. This allows determining the predetermined period according to the length of the echo generated by the reception signal.

Additionally, in the embodiment of the present invention, the mask generation unit 18 changes the magnitude of the learning signal and generates the plurality of masks, but the type of mask generated by the mask generation unit 18 is not limited thereto. For example, the mask generation unit 18 may generate the mask when only the echo signal caused by outputting, for example, the reflection of sound inside a vehicle or the vibration of the speaker 52 from the speaker 52 as a sound is input as the input signal. At this time, after the adaptive filter in the echo removal unit 11 finishes sufficient learning, the mask generation unit 18 determines the signal (see FIGS. 7(B) and 8(B)) transmitted through the transmitting signal path in a state where only an echo signal generated by output of, for example, a reflection of a sound inside a vehicle and a vibration of the speaker 52 from the speaker 52 as a sound as the learning signal, acquires the maximum value among the values of the learning power spectrums for each frequency band, and determines it as the mask.

Then, the mask selection unit 14 sequentially acquires the power spectrums of the reception signal and the input signal, and when acquiring the respective sample points, the mask selection unit 14 sequentially selects the optimal mask among the base masks based on the reception signal and the input signal acquired within the predetermined period before the time point at which the sample point was acquired. For example, in a case where a state in which the reception signal is 0 and the input signal is small continues for a few milliseconds, the mask selection unit 14 selects, as the optimal mask, a mask corresponding to a state where only the echo signal is generated due to, for example, the reflection of sound inside the vehicle or the vibration of the speaker 52 being output from the speaker 52 as a sound. This makes it possible to appropriately cancel the echo signal caused by, for example, the reflection of sound inside the vehicle and the vibration of the speaker 52 being output from the speaker 52 as a sound.

Second Embodiment

The second embodiment has a configuration in which the double-talk state is detected for each frequency band. Now, an echo suppression device 2 according to the second embodiment will be described. Note that the same components as those of the echo suppression device 1 according to the first embodiment are denoted by the same reference numerals, and description of the components will be omitted.

Figure 16:
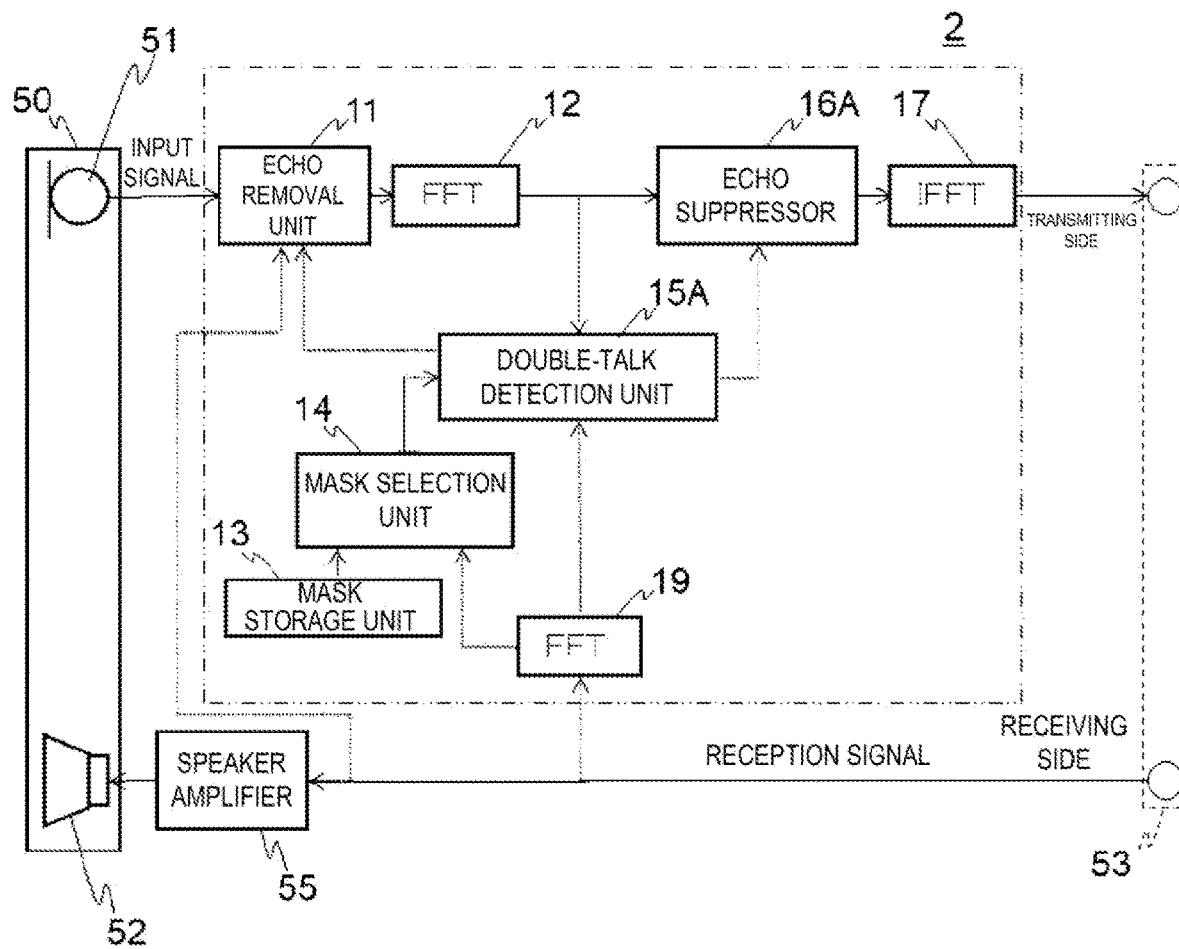
FIG. 16 is a diagram illustrating an overview of a function block of an echo suppression device 2.

FIG. 16 is a diagram illustrating an overview of a function block of the echo suppression device 2. The echo suppression device 2 mainly includes the echo removal unit 11, the FFT units 12 and 19, the mask storage unit 13, the mask selection unit 14, a double-talk detection unit 15A, an echo suppressor 16A, the IFFT unit 17, and the mask generation unit 18 (not illustrated).

The double-talk detection unit 15A detects, for each frequency band, whether there is a double-talk state. Note that the double-talk detection unit 15A sequentially performs the processing of detecting whether there is a double-talk state at every unit time when the input signal power spectrum is calculated.

Hereinafter, a method for detecting whether there is a double-talk state, the method being performed by the double-talk detection unit 15A, will be described in detail. First, the double-talk detection unit 15A compares, for each frequency band, the value of the input signal power spectrum input from the FFT unit 12 with the value of the optimal mask selected in the mask selection unit 14.

Additionally, the double-talk detection unit 15A acquires the reception signal transmitted from the cell phone 53 to the terminal, and obtains the signal level. The double-talk detection unit 15A compares the signal level of the reception signal with the threshold II.

Then, for frequency bands in which the value of the input signal power spectrum is not larger than the value of the optimal mask, the double-talk detection unit 15A detects that single-talk with only far-end speech is present and the double-talk state is absent in a case where the signal level of the reception signal is equal to or more than the threshold II.

Figure 17:
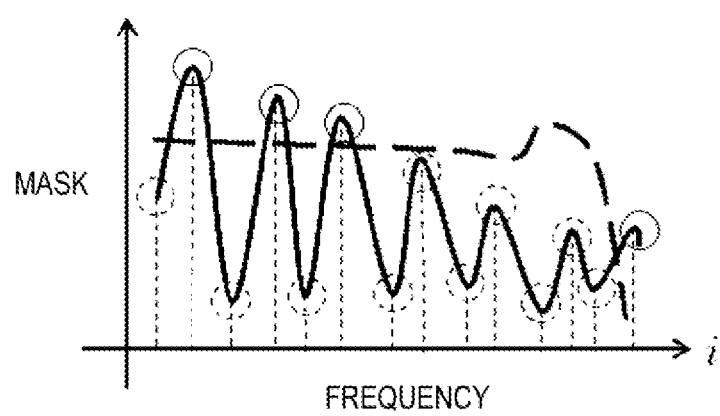
FIG. 17 is a diagram schematically illustrating a state of comparing the value of the input signal power spectrum with the value of the optimal mask in a case where a signal level of the reception signal is equal to or more than a threshold II.

FIG. 17 is a diagram schematically illustrating a state of comparing the value of the input signal power spectrum and the value of the optimal mask in a case where the signal level of the reception signal is equal to or more than the threshold II. In FIG. 17, the solid line indicates the input signal power spectrum, and the dashed line indicates the optimal mask.

In the frequency bands circled with solid lines in FIG. 17, the value of the input signal power spectrum is larger than the value of the optimal mask. Thus, for these frequency bands, the double-talk detection unit 15A detects that the far-end speech is present and the near-end speech is also present, that is, there is a double-talk state.

In contrast, in frequency bands circled with dotted lines in FIG. 17, the value of the input signal power spectrum is not larger than the value of the optimal mask. Thus, for these frequency bands, the double-talk detection unit 15A detects that the far-end speech is present whereas no near-end speech is present, and the single-talk with only far-end speech, that is, there is no double-talk state.

The description will now return to FIG. 16. The echo suppressor 16A performs echo suppression processing on the input signal that has passed through the FFT unit 12. The echo suppressor 16A enables the echo suppression processing for the frequency bands in which single-talk with only far-end speech has been detected, and disables the echo suppression processing for the other frequency bands. The echo suppressor 16A switches between enabling and disabling the echo suppression processing at every unit time.

According to the present embodiment, the double-talk state can be accurately detected for each frequency band, and the echo suppression processing can be enabled for each frequency band.

Third Embodiment

The third embodiment has a configuration in which the mask storage unit holds one base mask and generates an optimal mask in the mask selection unit. Now, an echo suppression device 3 according to the third embodiment will be described. Note that the same components as those of the echo suppression devices 1 and 2 according to the first and second embodiments are denoted by the same reference numerals, and description of the components is omitted.

Figure 18:
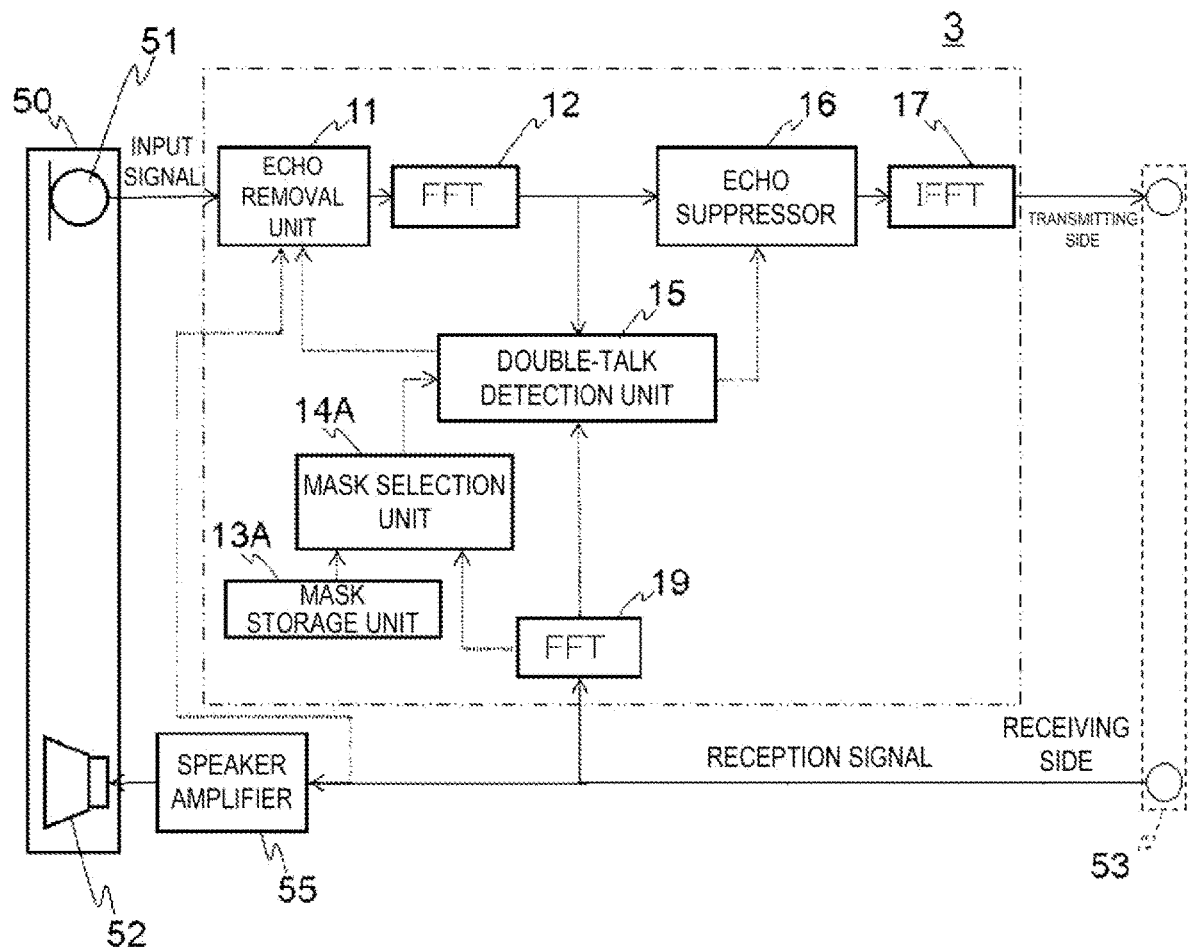
FIG. 18 is a diagram illustrating an overview of a function block of an echo suppression device 3.

FIG. 18 is a diagram illustrating an overview of a function block of the echo suppression device 3. The echo suppression device 3 mainly includes the echo removal unit 11, the FFT units 12 and 19, a mask storage unit 13A, a mask selection unit 14A, the double-talk detection unit 15, the echo suppressor 16, the IFFT unit 17, and the mask generation unit 18 (not illustrated).

The mask generation unit 18 generates the mask based on the power spectrum for the learning signal calculated by the FFT unit 12, and stores the generated mask. The mask generation unit 18 generates only the mask (see FIG. 5) generated assuming the large signal of the receiving signal path, and only the mask is stored in the mask storage unit 13A as a base mask.

The mask selection unit 14A generates the optimal mask by multiplying the base mask by a factor based on the maximum value of the power of the reception signal acquired within the predetermined period before the time point at which the sample point of the reception signal power spectrum was acquired.

Figure 19:
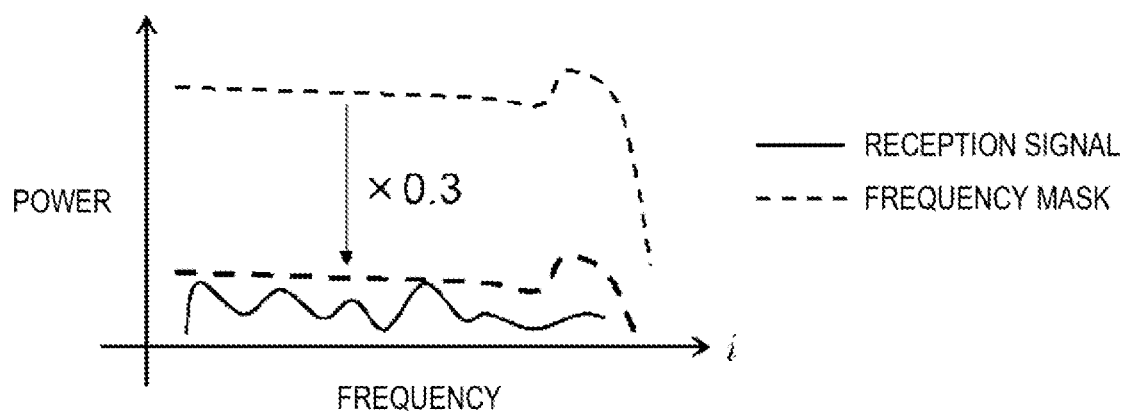
FIG. 19 is a diagram schematically illustrating a process in which a mask selection unit 14A generates the optimal mask.

FIG. 19 is a diagram schematically illustrating a process in which the mask selection unit 14A generates the optimal mask. In FIG. 19, the solid line indicates the maximum value of the reception signal power spectrum acquired within the predetermined period and the dashed line indicates the base mask. The mask selection unit 14A compares the maximum value of the power of the reception signal with the base mask for each frequency band, and multiplies the base mask by a coefficient such that the value of the optimal mask does not become smaller than the maximum value of the reception signal and the optimal mask approximates to the maximum value of the reception signal in any frequency band to generate the optimal mask. In the example illustrated in FIG. 18, the mask selection unit 14A generates the optimal mask by multiplying the power of base mask in each frequency band by the coefficient of 0.3. This allows the optimal mask to be generated considering frequency characteristics of the reception signal.

According to the present embodiment, it is not necessary to store the plurality of base masks and the memory used can be reduced. The present embodiment is effective when the shapes of the masks are similar regardless of the magnitudes of the reception signals.

Note that, in the present embodiment, the mask selection unit 14A generates the optimal mask by multiplying the power of base mask in each frequency band by any coefficient regardless of the frequency band, but a coefficient by which the base mask is multiplied may be changed for each frequency band. For example, the coefficient may be reduced as the frequency band increases. In this case, it is only necessary that the mask storage unit 13A holds a formula indicating the relationship between the magnitude of the frequency band and the coefficient, and the mask selection unit 14A obtains the coefficient in each frequency band based on the coefficient at any frequency and the formula indicating the relationship between the magnitude of the frequency band and the coefficient. This allows generating the optimal mask that further reflects the frequency characteristics of the reception signal.

Fourth Embodiment

The fourth embodiment has a configuration not using the FFT unit 19. Now, an echo suppression device 4 according to the fourth embodiment will be described. Note that the same components as those of the echo suppression devices 1 to 3 according to the first to third embodiments are denoted by the same reference numerals, and description of the components is omitted.

Figure 20:
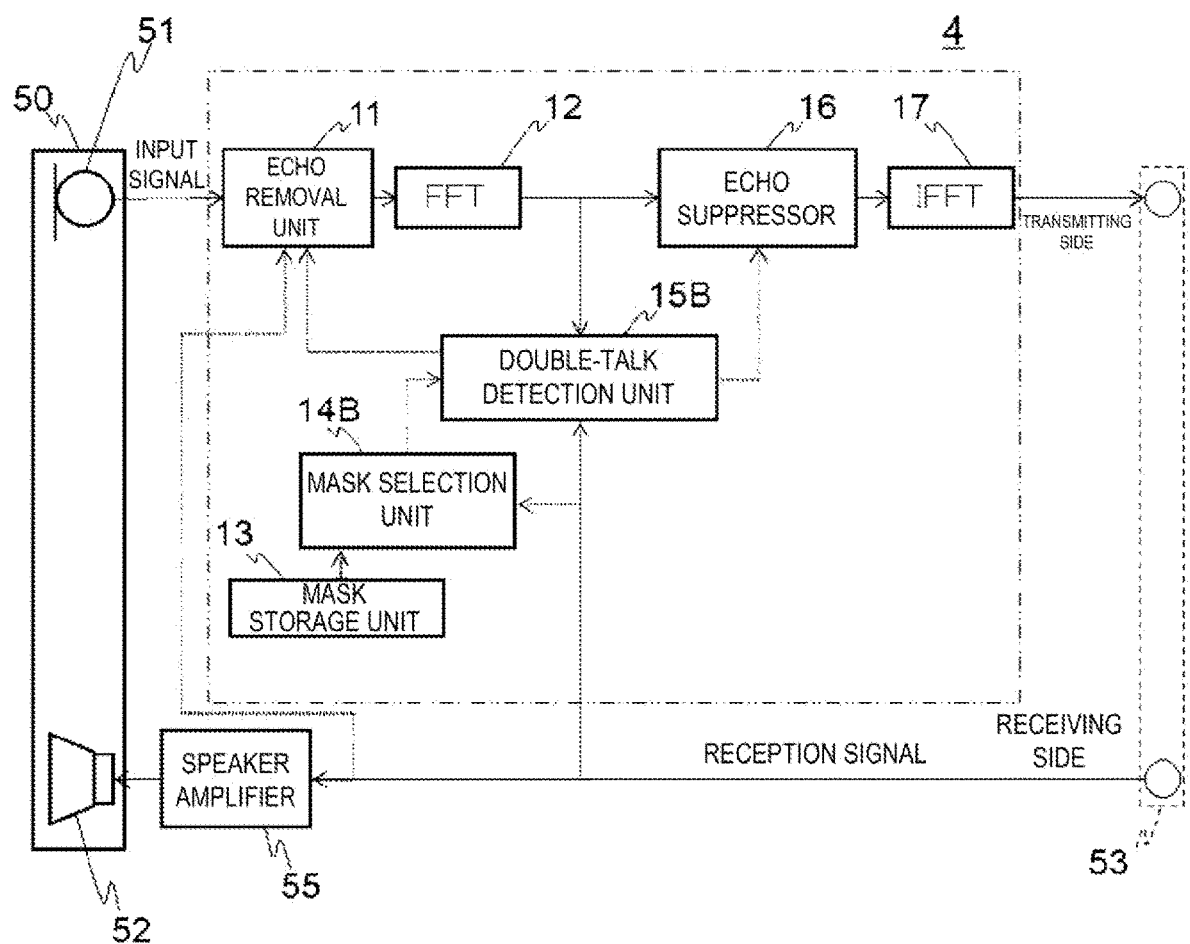
FIG. 20 is a diagram illustrating an overview of a function block of an echo suppression device 4.

FIG. 20 is a diagram illustrating an overview of a function block of the echo suppression device 4. The echo suppression device 4 mainly includes the echo removal unit 11, the FFT unit 12, the mask storage unit 13, a mask selection unit 14B, the double-talk detection unit 15, the echo suppressor 16, the IFFT unit 17, and the mask generation unit 18 (not illustrated).

To the mask selection unit 14B, the reception signal is sequentially input. When the reception signal is sequentially input (a sample point is acquired), the mask selection unit 14 sequentially selects the mask (hereinafter referred to as an optimal mask) according to the magnitude of the reception signal from the base masks based on the reception signal acquired within a predetermined period before a time point at which the sample point was acquired.

In the present embodiment, since the FFT unit 19 is not used, to the mask selection unit 14B, the power of the reception signal not divided for each frequency band is input. Then, the mask selection unit 14A compares the sum of the powers of the reception signals input during a constant period with the sum of the powers of the masks for each frequency band. Then, the mask selection unit 14B selects the mask in which the sum of the powers of the reception signals is smaller than the sum of the powers of the masks and the sum of the powers of the masks is the closest to the sum of the powers of the reception signals as the optimal mask among the base masks stored in the mask storage unit 13.

A double-talk detection unit 15B compares the input signal power spectrum input from the echo removal unit 11 with the value of the optimal mask selected by a mask selection unit 14 B, and counts the number (the excess number) of frequency bands in which the value of the input signal power spectrum is larger than the value of the optimal mask. Then, the double-talk detection unit 15B detects absence of the near-end speech when the excess number is equal to or less than any threshold.

The double-talk detection unit 15 compares the magnitude of the reception signal with the threshold prepared in advance. The double-talk detection unit 15 detects that the far-end speech (the speech by the user B (see FIG. 1)) is present and the signal is transmitted through the receiving signal path when the magnitude of the reception signal is equal to or more than the threshold prepared in advance.

According to the present embodiment, the calculation amount of the selection process of mask can be reduced.

Fifth Embodiment

The fifth embodiment has a configuration not using the FFT unit 12 or 19. Now, an echo suppression device 5 according to the fifth embodiment will be described. Note that the same components as those of the echo suppression devices 1 to 4 according to the first to fourth embodiments are denoted by the same reference numerals, and description of the components is omitted.

Figure 21:
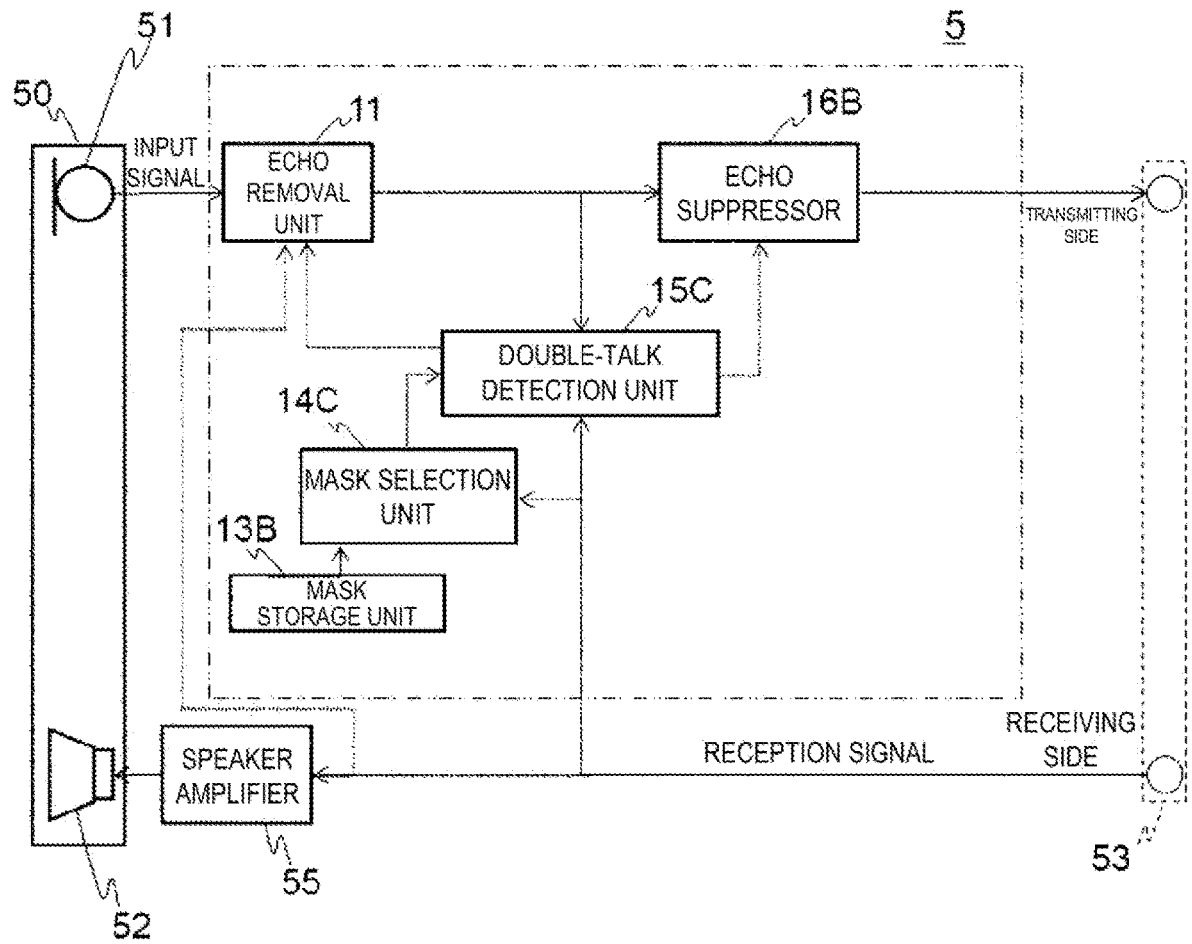
FIG. 21 is a diagram illustrating an overview of a function block of an echo suppression device 5.
Figure 22:
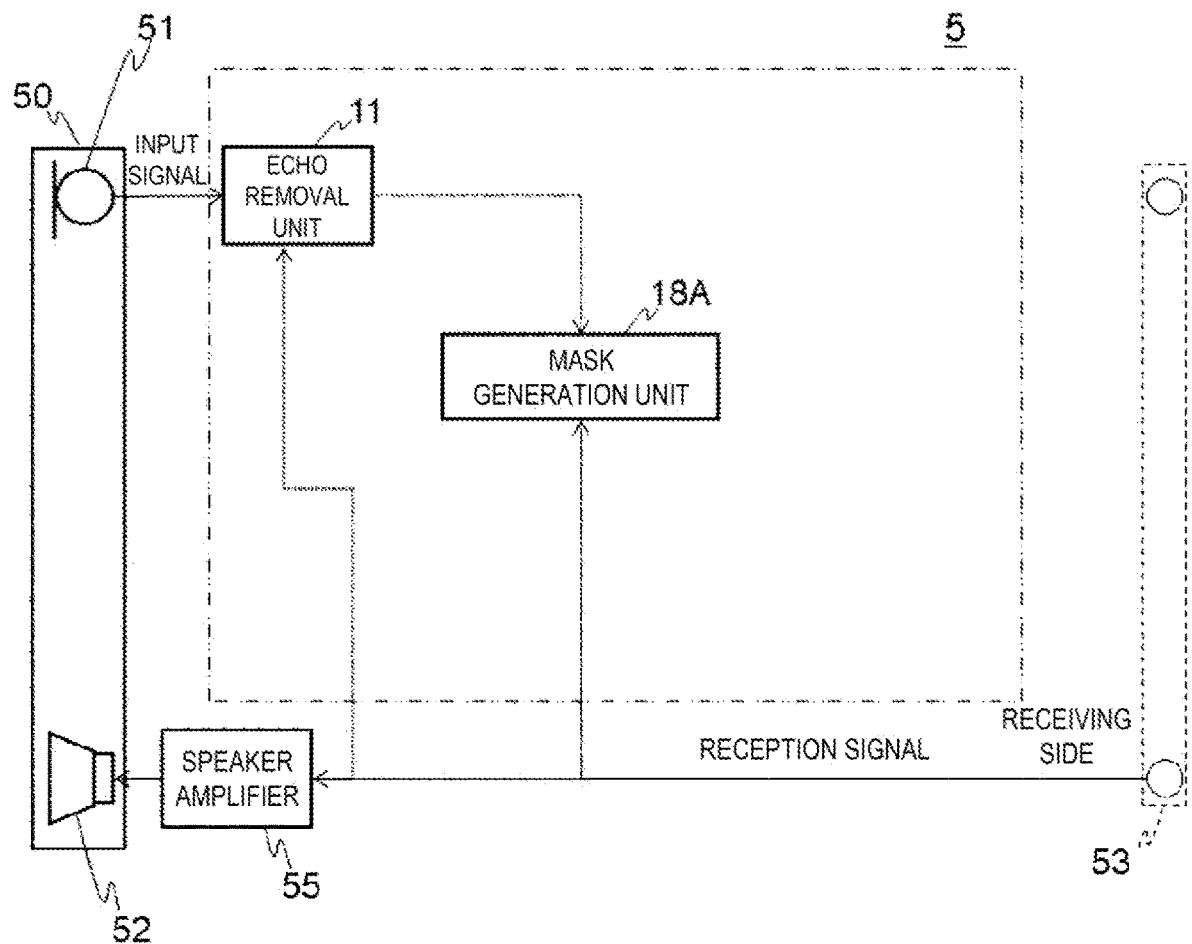
FIG. 22 is a diagram illustrating an overview of a function block in a case where a mask is generated in the echo suppression device 5.

FIG. 21 is a diagram illustrating an overview of a function block of the echo suppression device 5. FIG. 22 is a diagram illustrating an overview of the function block in a case where a mask is generated in the echo suppression device 5. The echo suppression device 5 mainly includes the echo removal unit 11, a mask storage unit 13B, a mask selection unit 14C, a double-talk detection unit 15C, an echo suppressor 16B, and a mask generation unit 18A.

First, the generation process of the mask will be described in detail with respect to FIG. 22. First, after the adaptive filter in the echo removal unit 11 finishes sufficient learning, one-sided speech (single-talk) on a far-end side in which a sound is output from the speaker 52 is repeated under a situation of the sound not being output from the microphone 51. The signal from which the echo has been removed by the echo removal unit 11 is treated as the learning signal.

The power (learning power) of the learning signal calculated at every regular interval is input to the mask generation unit 18A. The mask generation unit 18A stores the plurality of input learning powers. The mask generation unit 18A acquires the maximum value among the plurality of input learning powers and employs it as a mask. Thus, the generated mask has only one value.

In the present embodiment, the mask generation unit 18A performs a process that changes the magnitude (reception level) of the learning signal and generates a plurality of masks at a plurality of times to generate the plurality of masks. Thus, the magnitude of residual echo can be accurately stored for each reception level.

The description will now return to FIG. 21. The mask storage unit 13B stores the plurality of masks generated by the mask generation unit 18A as base masks.

To the mask selection unit 14C, the reception signal is sequentially input. When the reception signal power spectrum is sequentially input (a sample point is acquired), the mask selection unit 14C sequentially selects the mask (hereinafter referred to as an optimal mask) according to the magnitude of the reception signal from the base masks based on the reception signal acquired within a predetermined period before a time point at which the sample point was acquired.

In the present embodiment, since the FFT unit 19 is not used, to the mask selection unit 14C, the power of the reception signal not divided for each frequency band is input. The mask selection unit 14C compares the sum of the powers of the reception signals input during a constant period with the power of the mask. Then, the mask selection unit 14C selects the mask in which the sum of the powers of the reception signals is smaller than the power of the mask and the sum of the powers of the masks is the closest to the sum of the powers of the reception signals as the optimal mask among the base masks stored in the mask storage unit 13B.

For example, in a case where the mask storage unit 13B stores three masks (a first mask when the reception level is 3, a second mask when the reception level is 6, and a third mask when the reception level is 9) and the power of the reception signal input to the mask selection unit 14C is 2, the mask selection unit 14C selects the first mask as an optimal mask. For example, in a case where the power of the reception signal input to the mask selection unit 14C is 4, the mask selection unit 14C selects the second mask as an optimal mask.

The double-talk detection unit 15C compares the magnitude of the input signal input from the echo removal unit 11 with the value of the optimal mask selected by the mask selection unit 14C, and detects that the near-end speech is present when the magnitude of the input signal is larger than the value of the optimal mask.

The double-talk detection unit 15C compares the magnitude of the reception signal with the threshold prepared in advance. When the magnitude of the reception signal is equal to or more than the threshold prepared in advance, the double-talk detection unit 15C detects that the far-end speech is present.

The echo suppressor 16B enables the echo suppression processing of the input signal that has passed through the echo removal unit 11 in a case where the single-talk with only far-end speech is present and there is no double-talk state, and otherwise disables the echo suppression processing.

Figure 23:
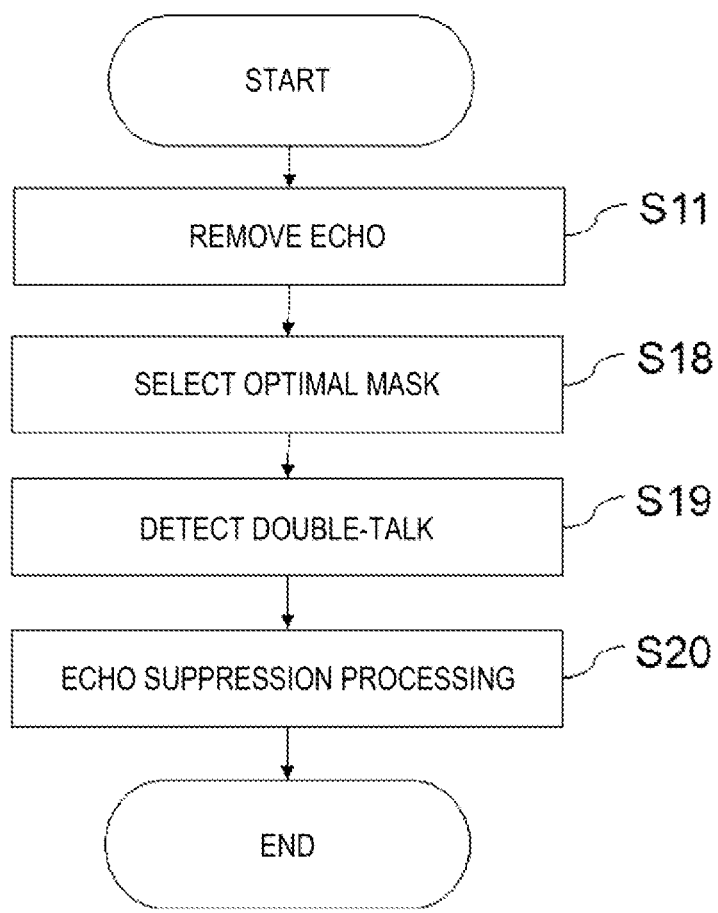
FIG. 23 is a flowchart depicting a flow of processes of sequentially reducing an echo by the echo suppression device 5.

FIG. 23 is a flowchart depicting a flow of processes of sequentially reducing an echo by the echo suppression device 5. The processing is performed continuously at every predetermined time while the reception signal and the input signal are input to the echo suppression device 5.

First, the echo removal unit 11 removes the echo from the input signal (Step S11), and the mask selection unit 14 selects the optimal mask from the base masks based on the power of the reception signal (Step S18).

Next, the double-talk detection unit 15 detects whether the double-talk state is present based on the power of the input signal from which the echo has been removed in Step S11 and the power of the reception signal (Step S19). Then, in a case where the single-talk only with the far-end speech is present, the echo suppressor 16 performs the echo suppression processing on the input signal from which the echo has been removed in Step S11 (Step S20).

According to the present embodiment, since the FFT process or the IFFT process is not performed, the calculation amount can be reduced.

The embodiments of the invention are described above in detail with reference to the drawings. However, specific configurations are not limited to the embodiments and also include changes in design or the like without departing from the gist of the invention. In particular, in the embodiments, for example, generation of the base mask, generation and selection of the optimal mask, and detection of the double-talk state are performed based on the power represented by the square of amplitude, but the processes may be performed based on an absolute value of the amplitude.

REFERENCE SIGNS LIST 1, 2, 3, 4, 5 Echo suppression device
11 Echo removal unit
12 FFT unit
13, 13A, 13B Mask storage unit
14, 14A, 14B, 14C Mask selection unit
15, 15A, 15B Double-talk detection unit
16, 16A, 16B Echo suppressor
17 IFFT unit
18, 18A Mask generation unit
19 FFT unit
50 Terminal
51 Microphone
52 Speaker
53, 54 Cell phone
55 Speaker amplifier
100 Voice communication system

What is claimed is:

1. An echo suppression device configured to be provided in a transmitting signal path that transmits an input signal input from a microphone, in a near-end terminal including a speaker and the microphone, the echo suppression device, comprising
a mask generation unit that
generates a base mask based on a learning signal transmitted through the transmitting signal path when a speech is not input to the microphone and a sound is output from the speaker, and
generates a plurality of masks by changing a magnitude of the learning signal, the plurality of masks including the base mask;
a mask storage unit that stores the plurality of masks;
a mask selection unit that sequentially selects an optimal mask from among the plurality of masks, the optimal mask selected for each sample point in time that a reception signal is acquired, the reception signal transmitted through a receiving signal path that transmits a signal to the speaker, the optimal mask selected according to;
a magnitude of a reception signal and
the base mask generated for the reception signal acquired within a predetermined period before the sample point in time;
a double-talk detection unit that sequentially detects whether a speech is input to the microphone at the sample point in time that the reception signal is acquired based on a result of comparing the input signal with the optimal mask selected for the sample point in time; and
an echo suppressor that sequentially performs a process of suppressing an echo on the input signal in response to the double-talk detection unit detecting that a speech is not input to the microphone and the reception signal includes a speech.

2. The echo suppression device according to claim 1, further comprising:
a signal measurement unit that measures a first time period, the first time period being a time period during which a signal is not transmitted through the transmitting signal path when a state transitions from a state in which a speech is not input to the microphone and a sound is output from the speaker to a state in which a speech is not input to the microphone and a sound is not output from the speaker, wherein
the mask selection unit sequentially selects the optimal mask with the first time period as the predetermined time period.

3. The echo suppression device according to claim 1, further comprising:
a first power spectrum calculation unit that calculates an input signal power spectrum and a learning power spectrum, the input signal power spectrum being a power spectrum for the input signal, the learning power spectrum being a power spectrum for the learning signal, wherein
the mask is a maximum value of the learning power spectrum for each frequency band acquired during a constant interval,
the optimal mask has a value for each frequency band, and
the double-talk detection unit detects whether the double-talk state is present based on a result of comparing a value of the input signal power spectrum with a value of the optimal mask for each frequency band.

4. The echo suppression device according to claim 3, further comprising:
a second power spectrum calculation unit that calculates a reception signal power spectrum as a power spectrum for the reception signal, wherein
the mask selection unit compares a maximum value of the reception signal power spectrum with the optimal mask for each frequency band and generates or selects the optimal mask.

5. The echo suppression device according to claim 3, wherein
the double-talk detection unit compares the input signal power spectrum with the optimal mask for each frequency band, when a number of frequency bands where the input signal power spectrum is larger than the optimal mask is smaller than a first threshold or an integrated value of regions where the input signal power spectrum is larger than the optimal mask is smaller than a second threshold, the double-talk detection unit detects that a speech is not input to the microphone.

6. The echo suppression device according to claim 1, further comprising:
a signal measurement unit that measures a first time period, the first time period being a time period until the input signal is no longer transmitted through the transmitting signal path from the microphone after the reception signal is no longer transmitted through the receiving signal path to the speaker, wherein
the mask selection unit sequentially selects the optimal mask with the first time period as the predetermined time period.

7. The echo suppression device according to claim 1, further comprising:
a signal measurement unit that measures a first time period, the first time period being a time required until the value of the input signal becomes 0 after the reception signal becomes 0, wherein
the mask selection unit sequentially selects the optimal mask with the first time period as the predetermined time period.

8. The echo suppression device according to claim 1, wherein
the mask selection unit sequentially selects the optimal mask according to the base mask generated for the reception signal acquired within 100 ms to 300 ms before the sample point in time.

9. An echo suppression device configured to be provided in a transmitting signal path that transmits an input signal input from a microphone, in a near-end terminal including a speaker and the microphone, the echo suppression device, comprising
a mask generation unit that
generates a base mask based on a learning signal transmitted through the transmitting signal path when a speech is not input to the microphone and a sound is output from the speaker, and
generates a plurality of masks by multiplying the base mask by a magnitude coefficient, the plurality of masks including the base mask;
a mask storage unit that stores the base mask;
a mask selection unit that sequentially causes generation of an optimal mask by the mask generation unit, the optimal mask generated for each sample point in time that a reception signal is acquired, the reception signal transmitted through a receiving signal path that transmits a signal to the speaker, the optimal mask generated according to:
a magnitude of a reception signal and
the base mask generated for the reception signal acquired within a predetermined period before the sample point in time;
a double-talk detection unit that sequentially detects whether a speech is input to the microphone at the sample point in time that the reception signal is acquired based on a result of comparing the input signal with the optimal mask generated for the sample point in time; and
an echo suppressor that sequentially performs a process of suppressing an echo on the input signal in response to the double-talk detection unit detecting that a speech is not input to the microphone and the reception signal includes a speech.

10. An echo suppression method, comprising:
generating and storing a base mask based on a learning signal transmitted through a transmitting signal path that transmits a signal input from a microphone when a speech is not input to the microphone of a near-end terminal and a sound is output from a speaker of the near-end terminal;
generating and storing a plurality of masks by changing a magnitude of the learning signal or by multiplying the base mask by a magnitude coefficient, the plurality of masks including the base mask;
sequentially selecting an optimal mask from among the plurality of masks, the optimal mask selected for each sample point in time that a reception signal is acquired, the reception signal transmitted through a receiving signal path that transmits a signal to the speaker, the optimal mask selected according to:
a magnitude of reception signal and
the base mask generated for the reception signal acquired within a predetermined period before the sample point in time;
sequentially detecting whether a speech is input to the microphone at the sample point in time that the reception signal is acquired based on a result of comparing the input signal with the optimal mask selected for the sample point in time; and
performing echo suppression processing that suppresses an echo on the input signal in response to detecting that a speech is not input to the microphone and the reception signal includes a speech.

11. A non-transitory storage medium storing an echo suppression program, which is provided in a transmitting signal path that transmits a signal input from a microphone in a near-end terminal including a speaker and the microphone, causing a computer to execute:
generating and storing a base mask based on a learning signal transmitted through a transmitting signal path that transmits a signal input from a microphone when a speech is not input to the microphone of a near-end terminal and a sound is output from a speaker of the near-end terminal;
generating and storing a plurality of masks by changing a magnitude of the learning signal or by multiplying the base mask by a magnitude coefficient, the plurality of masks including the base mask;
sequentially selecting an optimal mask from among the plurality of masks, the optimal mask selected for each sample point in time that a reception signal is acquired, the reception signal transmitted through a receiving signal path that transmits a signal to the speaker, the optimal mask selected according to;
a magnitude of reception signal and
the base mask generated for the reception signal acquired within a predetermined period before the sample point in time;
sequentially detecting whether a speech is input to the microphone at the sample point in time that the reception signal is acquired based on a result of comparing the input signal with the optimal mask selected for the sample point in time; and
performing echo suppression processing that suppresses an echo on the input signal in response to detecting that a speech is not input to the microphone and the reception signal includes a speech.

* * * * *